US012613909B2

(12) United States Patent (10) Patent No.: US 12,613,909 B2
Kobayashi et al. (45) Date of Patent: Apr. 28, 2026

(54) IMAGE SEARCH DEVICE, IMAGE SEARCH METHOD, AND IMAGE SEARCH PROGRAM

(71) Applicants: NATIONAL CANCER CENTER, Tokyo (JP); FUJIFILM Corporation, Tokyo (JP)

(72) Inventors: Kazuma Kobayashi, Tokyo (JP); Mototaka Miyake, Tokyo (JP); Ryuji Hamamoto, Tokyo (JP)

(73) Assignees: NATIONAL CANCER CENTER, Tokyo (JP); FUJIFILM Corporation, Tokyo (JP)

( * ) Notice: Subject to any disclaimer, the term of this patent is extended or adjusted under 35 U.S.C. 154(b) by 347 days.

(21) Appl. No.: 18/539,303

(22) Filed: Dec. 14, 2023

(65) Prior Publication Data

US 2024/0111804 A1 Apr. 4, 2024

Related U.S. Application Data

(63) Continuation of application No. PCT/JP2022/018956, filed on Apr. 26, 2022.

(30) Foreign Application Priority Data

Jun. 29, 2021 (JP) ................................. 2021-107772

(51) Int. Cl.
*G06F 16/583* (2019.01)
*G06F 16/532* (2019.01)

(52) U.S. Cl.
CPC .......... *G06F 16/583* (2019.01); *G06F 16/532* (2019.01)

(58) Field of Classification Search
None
See application file for complete search history.

(56) References Cited

U.S. PATENT DOCUMENTS

2008/0232667 A1* 9/2008 Kitamura .............. G06T 7/0012
382/132
2010/0100457 A1* 4/2010 Rathod .............. G06Q 30/0641
705/26.1

(Continued)

FOREIGN PATENT DOCUMENTS

JP 2003025723 1/2003
JP 2008229161 10/2008

(Continued)

OTHER PUBLICATIONS

"International Search Report (Form PCT/ISA/210) of PCT/JP2022/018956", mailed on Jul. 19, 2022, with English translation thereof, pp. 1-5.

(Continued)

*Primary Examiner* — Akwasi M Sarpong
*Assistant Examiner* — Pawan Dhingra
(74) *Attorney, Agent, or Firm* — JCIPRNET

(57) ABSTRACT

A processor receives an input of finding information indicating at least one finding, which is desired to be searched for, on a query base image, which includes a part desired to be searched for and is a source of a query image, to derive the query image to which the finding has been added, derives at least one added finding feature amount indicating an image feature for the added finding, and derives a query normal feature amount indicating an image feature for a normal region included in the part in the query base image. The processor derives similarities between the query image and a plurality of reference images including findings on the basis of comparisons between the added finding feature amount and the query normal feature amount and the like with reference to an image database in which the plurality of reference images have been registered and extracts the reference image that is similar to the query image as a (Continued)

similar image from the image database on the basis of the similarities.

15 Claims, 12 Drawing Sheets

(56)                    References Cited

U.S. PATENT DOCUMENTS

| | | | |
|---|---|---|---|
| 2012/0155717 A1* | 6/2012 | Ma | G06F 16/5854 |
| | | | 382/118 |
| 2013/0114867 A1* | 5/2013 | Kondo | G06V 30/1985 |
| | | | 382/128 |
| 2020/0065324 A1* | 2/2020 | Watanabe | G06F 16/532 |
| 2021/0294834 A1* | 9/2021 | Mai | G06N 3/045 |
| 2022/0237788 A1* | 7/2022 | Shaul | G16H 50/70 |

| | | | |
|---|---|---|---|
| 2022/0254029 A1* | 8/2022 | Vorontsov | G06V 10/774 |
| 2023/0206447 A1* | 6/2023 | Kobayashi | G06V 10/7715 |
| | | | 382/159 |

FOREIGN PATENT DOCUMENTS

| | | | |
|---|---|---|---|
| JP | 2009528595 | | 8/2009 |
| JP | 2011118543 | | 6/2011 |
| JP | 2011118543 A | * | 6/2011 |
| JP | 2017099907 | | 6/2017 |
| JP | 2017099907 A | * | 6/2017 |
| JP | 2018165926 | | 10/2018 |

OTHER PUBLICATIONS

"Written Opinion of the International Searching Authority (Form PCT/ISA/237) of PCT/ JP2022/018956", mailed on Jul. 19, 2022, with English translation thereof, pp. 1-8.

* cited by examiner

FIG. 6

| REFERENCE IMAGE | SIMILARITY |
|---|---|
| IMG0012.dcm | 0.87 |
| IMG0254.dcm | 0.77 |
| IMG0123.dcm | 0.54 |
| IMG0022.dcm | 0.52 |
| | |

IMAGE SEARCH DEVICE, IMAGE SEARCH METHOD, AND IMAGE SEARCH PROGRAM

CROSS-REFERENCE TO RELATED APPLICATIONS

This application is a continuation of International Application No. PCT/JP2022/018956, filed on Apr. 26, 2022, which claims priority from Japanese Patent Application No. 2021-107772, filed on Jun. 29, 2021. The entire disclosure of each of the above applications is incorporated herein by reference.

BACKGROUND

Technical Field

The present disclosure relates to an image search device, an image search method, and an image search program.

Related Art

In recent years, diagnosis has been performed using medical images acquired by medical apparatuses, such as a computed tomography (CT) apparatus and a magnetic resonance imaging (MRI) apparatus. In a case in which diagnosis is performed using images, past medical images that are similar to a case for findings included in the medical image to be diagnosed are generally referred to. A large number of past medical images are stored in an image database that is called a picture archiving and communication system (PACS) provided in, for example, a hospital. Therefore, a method has been proposed which searches for a past medical image that is similar to a target medical image. For example, JP2003-025723A proposes a method that extracts a color, texture, a shape, or the like as a feature amount from a query image, which is a search source, and that searches for a reference image having a feature amount similar to the extracted feature amount. Further, JP2018-165926A proposes a method that derives a feature amount of a query image using a convolutional neural network and that searches for a reference image having a feature amount similar to the derived feature amount.

A query image is required to search for an image. However, in a case in which a query image including a desired finding is not at hand, it is not possible to perform the search. In addition, in a clinical field, there is a demand to comparatively interpret different diseases in the same part. For example, it is assumed that a cystic lesion is found at a specific anatomical position of a brain and image diagnosis is performed using an MRI image of a head suspected to have a brain tumor or a brain abscess. In this case, there is a demand to search for an MRI image including a brain tumor and an MRI image including a brain abscess in a specific anatomical part from a database, to check features unique to each disease again, and to perform a final diagnosis on the image to be diagnosed.

In this case, a user, such as a doctor, who searches for an image, needs to check the images stored in the database one by one to search for the query image. However, this work requires a lot of labor, which is not practical.

SUMMARY OF THE INVENTION

The present disclosure has been made in view of the above circumstances, and an object of the present disclosure is to enable a user to easily search for a desired image.

According to the present disclosure, there is provided an image search device comprising at least one processor. The processor is configured to: receive an input of finding information indicating at least one finding, which is desired to be searched for, on a query base image, which includes a part desired to be searched for and is a source of a query image, to derive the query image to which the finding has been added; derive at least one added finding feature amount indicating an image feature for the added finding; derive at least one query normal feature amount indicating an image feature for a normal region included in the part in the query base image; with reference to an image database in which a plurality of reference images which include findings and in which at least one reference finding feature amount indicating an image feature for the finding included in each of the reference images and at least one reference normal feature amount indicating an image feature for an image in a case in which the finding included in each of the reference images is a normal region are associated with each other have been registered, derive a similarity between the query image and each of the plurality of reference images on the basis of comparisons between the added finding feature amount and the query normal feature amount, and the reference finding feature amount and the reference normal feature amount; and extract the reference image that is similar to the query image as a similar image from the image database on the basis of the similarity.

Further, in the image search device according to the present disclosure, the finding information may include a region corresponding to a type of the finding.

In addition, in the image search device according to the present disclosure, the processor may be configured to: encode the added finding to derive the added finding feature amount; and encode the query base image to derive the query normal feature amount.

Further, in the image search device according to the present disclosure, the query base image may be a standard image in which the part desired to be searched for consists of only normal regions.

Furthermore, the image search device according to the present disclosure may further comprise a storage that stores at least one finding feature vector indicating a representative image feature for the finding and a normal feature vector indicating a representative image feature for the normal region. The processor may be configured to: derive the added finding feature amount by deriving an added finding feature vector indicating an image feature for the added finding and substituting the added finding feature vector with a finding feature vector, which has a minimum difference from the added finding feature vector, among the finding feature vectors to quantize the added finding feature vector; and derive the query normal feature amount by deriving a query normal feature vector indicating an image feature for a normal region included in the part in the query base image and substituting the query normal feature vector with a normal feature vector, which has a minimum difference from the query normal feature vector, among the normal feature vectors to quantize the query normal feature vector.

In addition, in the image search device according to the present disclosure, the query base image may be an image including a finding, and the query normal feature amount may indicate an image feature for an image in a case in which the finding included in the query base image is a normal region.

Further, the image search device according to the present disclosure may further comprise a storage that stores at least one finding feature vector indicating a representative image feature for the finding and a normal feature vector indicating a representative image feature for an image in a case in which the included finding is a normal region. The processor may be configured to: derive the added finding feature amount by deriving an added finding feature vector indicating an image feature for the added finding and substituting the added finding feature vector with a finding feature vector, which has a minimum difference from the added finding feature vector, among the finding feature vectors to quantize the added finding feature vector; and derive the query normal feature amount by deriving a query normal feature vector indicating an image feature for the query base image in a case in which a region including the finding is a normal region in the query base image and substituting the query normal feature vector with a normal feature vector, which has a minimum difference from the query normal feature vector, among the normal feature vectors to quantize the query normal feature vector.

Furthermore, in the image search device according to the present disclosure, the processor may be configured to derive the added finding feature amount using an encoding learning model that has been trained to derive the added finding feature amount in a case in which the added finding is input.

In addition, in the image search device according to the present disclosure, the processor may be configured to derive the query normal feature amount using an encoding learning model that has been trained to derive the query normal feature amount in a case in which the query base image is input.

Further, in the image search device according to the present disclosure, the reference finding feature amount and the reference normal feature amount may be derived by encoding the reference image.

Furthermore, in the image search device according to the present disclosure, a combination of the reference finding feature amount and the reference normal feature amount may indicate an image feature for the reference image.

Moreover, in the image search device according to the present disclosure, the reference finding feature amount may be quantized and derived by substituting a feature vector indicating an image feature for an abnormality of a finding included in the reference image with a first feature vector, which has a minimum difference from the image feature for the abnormality of the finding, among one or more first feature vectors indicating a representative image feature for the abnormality of the finding, and the reference normal feature amount may be quantized and derived by substituting a feature vector indicating an image feature for the reference image in a case in which the finding is a normal region with a second feature vector, which has a minimum difference from the image feature for the reference image in a case in which the finding is the normal region, among one or more second feature vectors indicating a representative image feature for the image in a case in which the finding is the normal region.

Further, in the image search device according to the present disclosure, the reference finding feature amount and the reference normal feature amount may be derived using an encoding learning model that has been trained to derive the reference finding feature amount and the reference normal feature amount in a case in which the reference image is input.

According to the present disclosure, there is provided an image search method comprising: receiving an input of finding information indicating at least one finding, which is desired to be searched for, on a query base image, which includes a part desired to be searched for and is a source of a query image, to derive the query image to which the finding has been added; deriving at least one added finding feature amount indicating an image feature for the added finding; deriving at least one query normal feature amount indicating an image feature for a normal region included in the part in the query base image; deriving, with reference to an image database in which a plurality of reference images which include findings and in which at least one reference finding feature amount indicating an image feature for the finding included in each of the reference images and at least one reference normal feature amount indicating an image feature for an image in a case in which the finding included in each of the reference images is a normal region are associated with each other have been registered, a similarity between the query image and each of the plurality of reference images on the basis of comparisons between the added finding feature amount and the query normal feature amount, and the reference finding feature amount and the reference normal feature amount; and extracting the reference image that is similar to the query image as a similar image from the image database on the basis of the similarity.

In addition, a program that causes a computer to execute the image search method according to the present disclosure may be provided.

According to the present disclosure, the user can easily search for a desired image.

BRIEF DESCRIPTION OF THE DRAWINGS

FIG. 6 is a conceptual diagram illustrating processes performed by an image encoding unit and an image decoding unit.

FIG. 11 is a diagram illustrating derivation of a feature amount from a query image $Q0$ in a case in which similar images are searched for.

FIG. 12 is a diagram illustrating a search result list.

DETAILED DESCRIPTION

Figure 1:
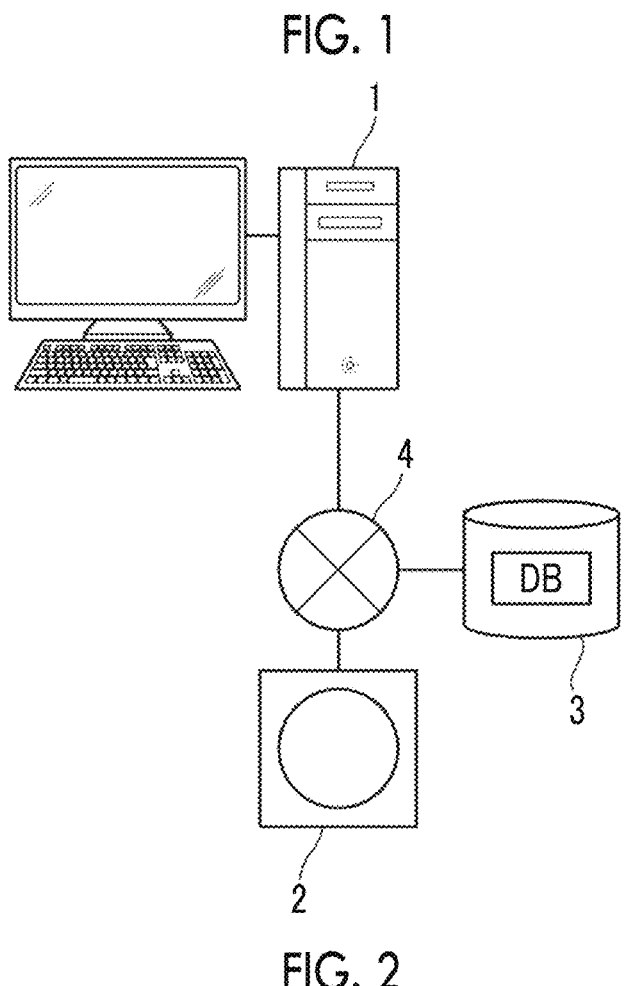
FIG. 1 is a diagram illustrating a schematic configuration of a medical information system to which an image search device according to an embodiment of the present disclosure is applied.

Hereinafter, an embodiment of the present disclosure will be described with reference to the drawings. First, a configuration of a medical information system to which an image search device according to this embodiment is applied will be described. FIG. 1 is a diagram illustrating a schematic configuration of the medical information system. In the medical information system illustrated in FIG. 1, a computer 1 including the image search device according to this embodiment, an imaging apparatus 2, and an image storage server 3 are connected via a network 4 such that they can communicate with each other.

The computer 1 includes the image search device according to this embodiment, and an image search program according to this embodiment is installed in the computer 1. The computer 1 may be a workstation or a personal computer that is directly operated by a doctor who performs diagnosis or may be a server computer that is connected to them through the network. The image search program is stored in a storage device of the server computer connected to the network or in a network storage to be accessible from the outside and is downloaded and installed in the computer 1 used by the doctor in response to a request. Alternatively, the image search program is recorded on a recording medium, such as a digital versatile disc (DVD) or a compact disc read only memory (CD-ROM), is distributed, and is installed in the computer 1 from the recording medium.

The imaging apparatus 2 is an apparatus that images a diagnosis target part of a subject and that generates a three-dimensional image indicating the part and is specifically a computed tomography (CT) apparatus, a magnetic resonance imaging (MRI) apparatus, a positron emission tomography (PET) apparatus, or the like. The three-dimensional image, which has been generated by the imaging apparatus 2 and consists of a plurality of slice images, is transmitted to the image storage server 3 and is then stored therein. In addition, in this embodiment, it is assumed that a diagnosis target part of a patient that is the subject is a brain and the imaging apparatus 2 is an MRI apparatus and generates an MRI image of a head including the brain of the subject as the three-dimensional image.

The image storage server 3 is a computer that stores and manages various types of data and comprises a high-capacity external storage device and database management software. The image storage server 3 performs communication with other apparatuses through the wired or wireless network 4 to transmit and receive, for example, image data. Specifically, the image storage server 3 acquires various types of data including the image data of the three-dimensional image generated by the imaging apparatus 2 through the network, stores the acquired data in a recording medium, such as a high-capacity external storage device, and manages the data. In addition, the storage format of the image data and the communication between the apparatuses through the network 4 are based on a protocol such as digital imaging and communication in medicine (DICOM). Further, the image storage server 3 stores training data which will be described below.

Further, in this embodiment, an image database DB is stored in the image storage server 3. A plurality of images including various diseases for various parts of a human body are registered as reference images in the image database DB. For example, images including brain tumor, cerebral hemorrhage, cerebral infarction, and the like for the brain and images including a lung cancer for the lung are registered as the reference images. The image database DB will be described below. Further, in this embodiment, the reference image is also a three-dimensional image consisting of a plurality of slice images.

Figure 2:
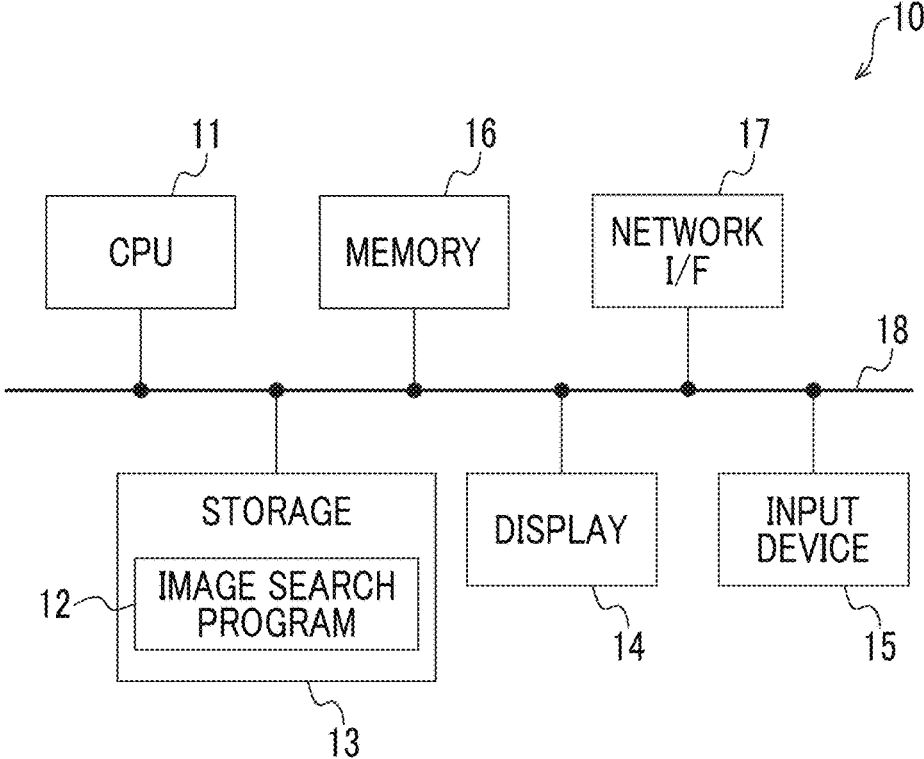
FIG. 2 is a diagram illustrating a schematic configuration of an image processing system including the image search device according to this embodiment.

Next, the image search device according to this embodiment will be described. FIG. 2 illustrates a hardware configuration of an image processing system including the image search device according to this embodiment. As illustrated in FIG. 2, an image search device 10 according to this embodiment includes a central processing unit (CPU) 11, a non-volatile storage 13, and a memory 16 as a temporary storage area. In addition, the image search device 10 includes a display 14, such as a liquid crystal display, an input device 15, such as a keyboard and a mouse, and a network interface (I/F) 17 that is connected to the network 4. The CPU 11, the storage 13, the display 14, the input device 15, the memory 16, and the network I/F 17 are connected to a bus 18. In addition, the CPU 11 is an example of a processor according to the present disclosure.

The storage 13 is implemented by, for example, a hard disk drive (HDD), a solid state drive (SSD), and a flash memory. An image search program 12 is stored in the storage 13 as a storage medium. The CPU 11 reads the image search program 12 from the storage 13, deploys the image search program 12 in the memory 16, and executes the deployed image search program 12.

Figure 3:
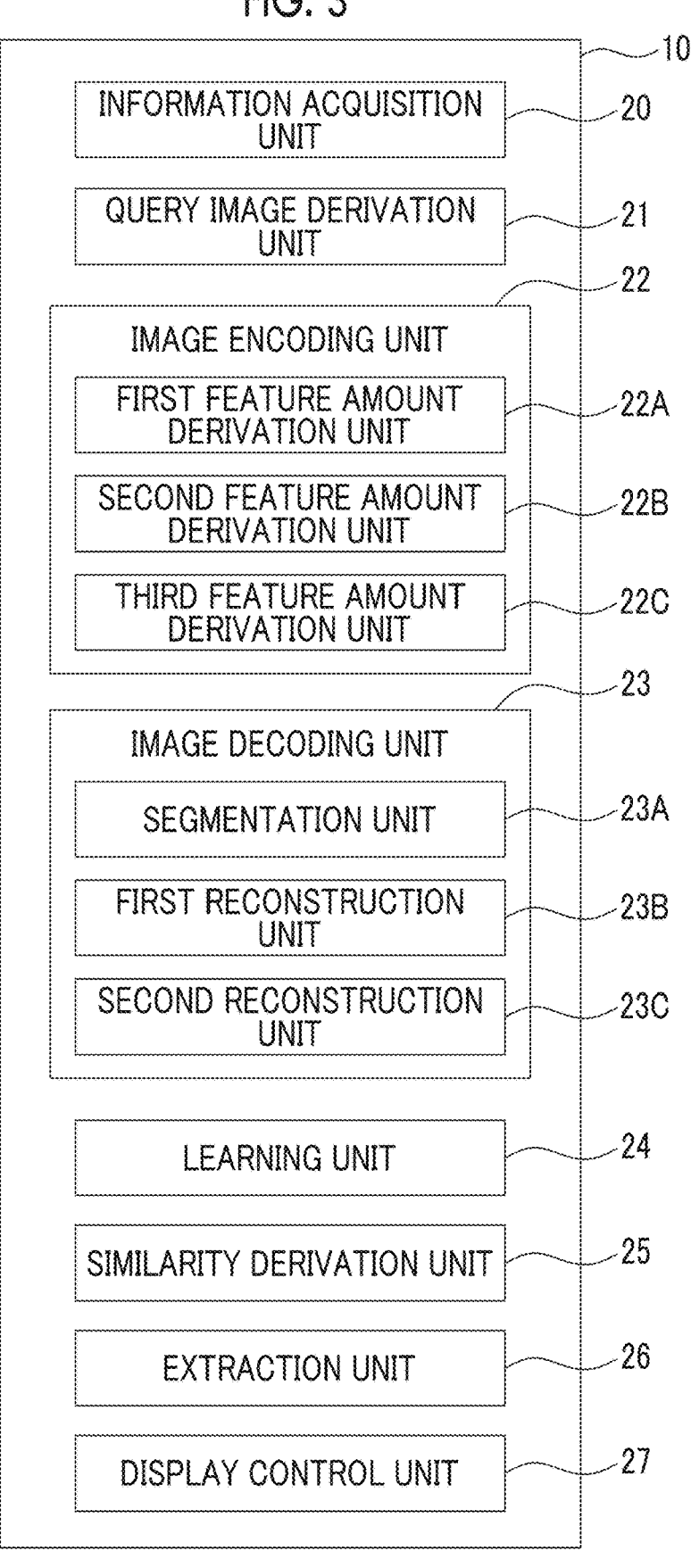
FIG. 3 is a functional configuration diagram illustrating the image processing system including the image search device according to this embodiment.

Next, a functional configuration of the image search device according to this embodiment will be described. FIG. 3 is a diagram illustrating a functional configuration of the image processing system including the image search device according to this embodiment. As illustrated in FIG. 3, the image search device 10 according to this embodiment comprises an information acquisition unit 20, a query image derivation unit 21, an image encoding unit 22, an image decoding unit 23, a learning unit 24, a similarity derivation unit 25, an extraction unit 26, and a display control unit 27. The image encoding unit 22 comprises a first feature amount derivation unit 22A, a second feature amount derivation unit 22B, and a third feature amount derivation unit 22C. The image decoding unit 23 comprises a segmentation unit 23A, a first reconstruction unit 23B, and a second reconstruction unit 23C.

Then, the CPU 11 executes the image search program 12 to function as the information acquisition unit 20, the query image derivation unit 21, the first feature amount derivation unit 22A, the second feature amount derivation unit 22B, the third feature amount derivation unit 22C, the similarity derivation unit 25, the extraction unit 26, and the display control unit 27. Further, the CPU 11 executes a learning program (not illustrated) to function as the first feature amount derivation unit 22A, the second feature amount derivation unit 22B, the third feature amount derivation unit 22C, the segmentation unit 23A, the first reconstruction unit 23B, the second reconstruction unit 23C, and the learning unit 24.

The information acquisition unit 20 acquires a query base image for deriving a query image to be searched for, which will be described below, from the image storage server 3 in response to an instruction input from the input device 15 by an operator. The query base image includes a part desired to be searched for. In addition, the information acquisition unit 20 acquires, from the image storage server 3, a plurality of training data items for the learning unit 24 to train an encoding learning model in the image encoding unit 22 and a decoding learning model in the image decoding unit 23 as described below, in response to an instruction input from the input device 15 by the operator.

Further, in a case in which the query base image and the training data have already been stored in the storage 13, the information acquisition unit 20 may acquire the query base image and the training data from the storage 13.

Figure 4:
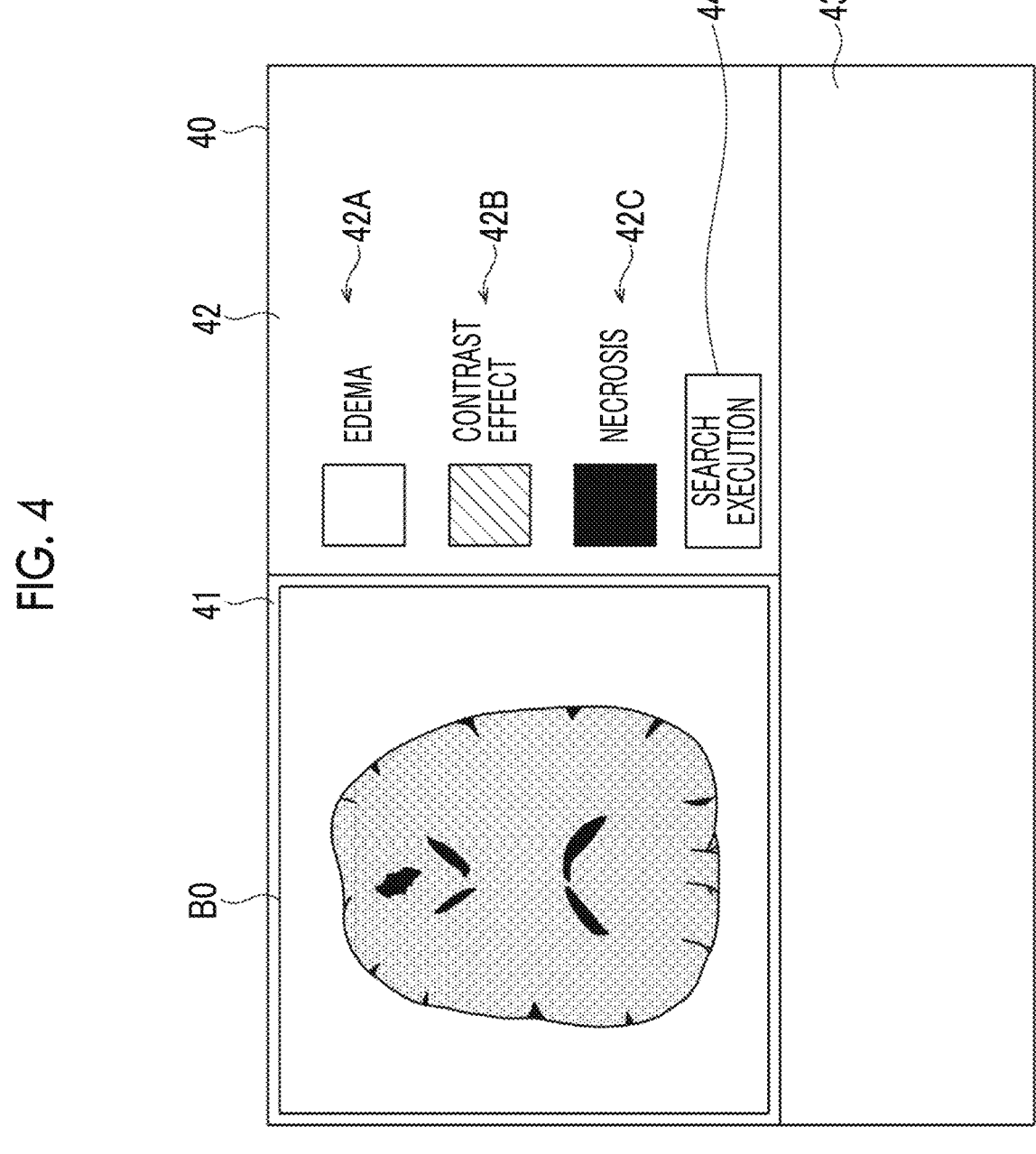
FIG. 4 is a diagram illustrating a search screen.

The query image derivation unit 21 derives the query image. In the derivation of the query image, first, the display control unit 27 displays a search screen on the display 14. FIG. 4 is a diagram illustrating the search screen. As illustrated in FIG. 4, a search screen 40 includes a first display region 41 which is a work region for deriving and displaying a query image, a second display region 42 for selecting a finding, a third display region 43 for displaying a search result, and a search execution button 44.

A query base image B0 including a part desired to be searched for is displayed in the first display region 41. As illustrated in FIG. 4, the query base image B0 is, for example, a standard image in which the part desired to be searched for consists of only normal regions. In this embodiment, since the part desired to be searched for is the brain, the query base image B0 is a standard brain image. Examples of the standard image include a standard human body atlas image, a representative actual image of a healthy person, an average image obtained by averaging actual images of a plurality of healthy persons, and an artificially generated image. In addition, the query base image B0 may originally include findings. The query base image B0 including the findings will be described below.

In a case in which the user gives an instruction using the input device 15 on an image acquisition screen (not illustrated), the information acquisition unit 20 acquires the query base image B0 from the image storage server 3 or the storage 13. The query base image B0 is a three-dimensional image consisting of a plurality of slice images such as MRI images. Therefore, the user can sequentially switch the slice images to be displayed in the first display region 41 using a mouse wheel of the input device 15, such that the slice images are displayed.

A list of findings that can be added to the query base image B0 is displayed in the second display region 42. In this embodiment, the list of findings includes three types of findings of edema 42A, a contrast effect 42B, and necrosis 42C, and regions corresponding to the three types of findings can be added to the query base image B0. In FIG. 4, for the sake of description, white is assigned to the edema 42A, oblique hatching is assigned to the contrast effect 42B, and black is assigned to the necrosis 42C. However, it is preferable to assign colors. In addition, any pattern may be assigned.

First, the user selects a slice image to which a finding is added. In addition, the slice image to which the finding is added is also referred to as the query base image B0. Then, the user selects one finding from the list of findings displayed in the second display region 42 with a mouse cursor. Then, the user can draw a region corresponding to the type of the selected finding at a desired position in the query base image B0 to add the finding to the query base image B0. Further, different findings can be superimposed, and regions corresponding to the types of findings can be drawn to add the findings.

Figure 5:
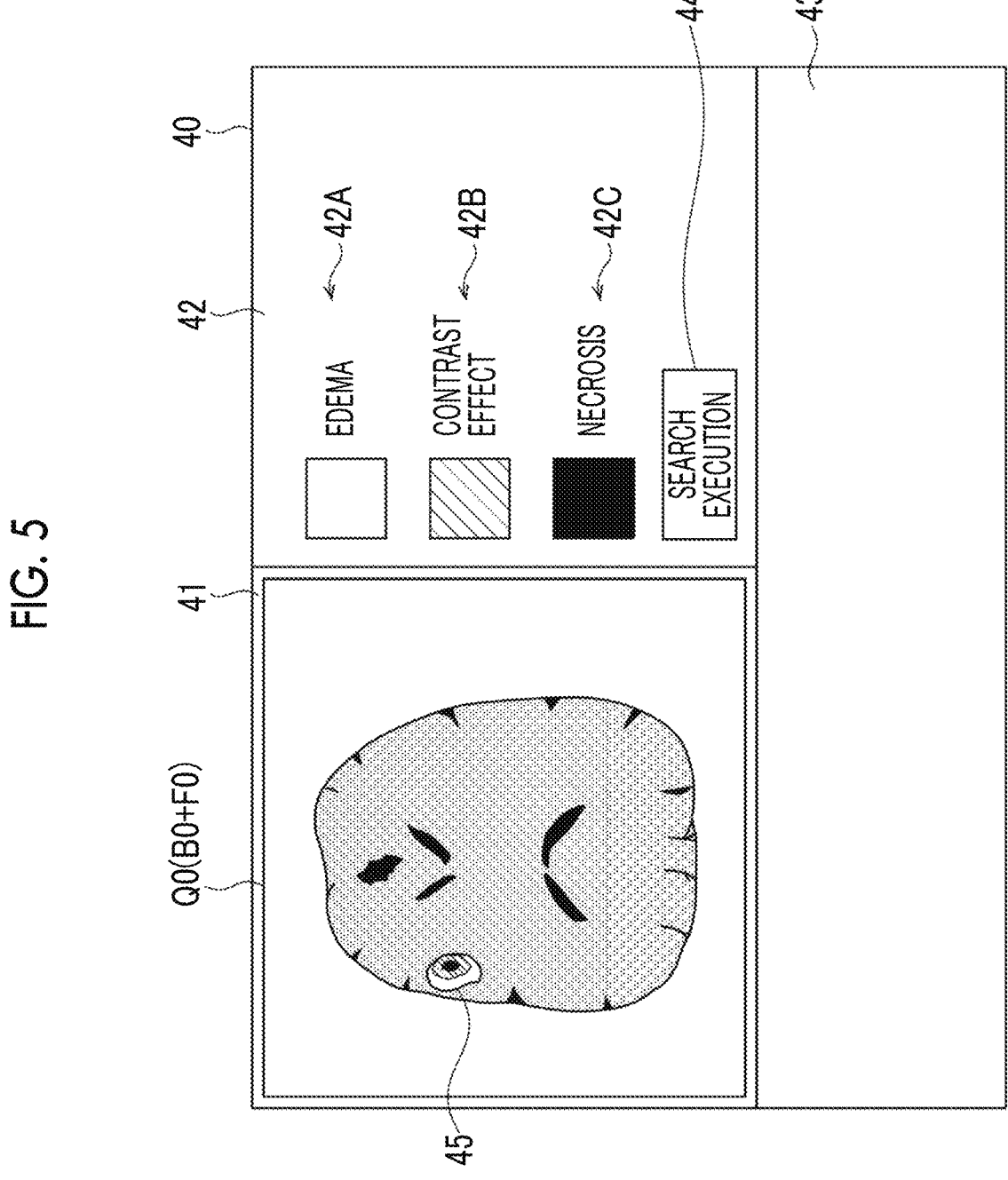
FIG. 5 is a diagram illustrating the search screen on which a query image has been derived.

FIG. 5 is a diagram illustrating a search screen including the query base image B0 to which a finding has been added. In FIG. 5, a finding 45 in which regions corresponding to three types of findings of the edema, the contrast effect, and the necrosis have been superimposed in order from the outside is added to a left region (a region of a right brain) of the query base image B0. Since the query base image B0 to which the finding 45 has been added is used for search, it is a query image Q0. In addition, in this embodiment, the query image Q0 is derived by adding the finding 45 to the query base image B0. However, the query image Q0 is an image in which the query base image B0 and an image (hereinafter, referred to as an added finding label image) F0 including only the region of the finding 45 have been superimposed.

Here, the derived query image Q0 is input to the image encoding unit 22 in a case in which a similar image search is performed as described below, and the query base image B0 and the added finding label image F0 are encoded separately. In the following description, it is assumed that the query image Q0 derived by the query image derivation unit 21, and the query base image B0 and the added finding label image F0 constituting the query image Q0 are collectively referred to as a target query image.

In addition, in a case in which the similar image search is performed, not only the query image Q0 derived by the query image derivation unit 21 but also an image that has been acquired by imaging a subject having an abnormality and that originally includes findings is input as the reference image to the image encoding unit 22 and then encoded. Meanwhile, in this embodiment, the reference image may not include any findings.

The target query image is encoded by the second feature amount derivation unit 22B and the third feature amount derivation unit 22C constituting the image encoding unit 22. The reference image is encoded by the first feature amount derivation unit 22A and the second feature amount derivation unit 22B constituting the image encoding unit 22. First, the encoding of the target query image will be described.

The second feature amount derivation unit 22B constituting the image encoding unit 22 encodes the query base image B0 among the target query images to derive, as a second feature amount, at least one query normal feature amount indicating an image feature for a normal region included in a part in the query base image B0.

Further, in this embodiment, in a case in which a finding is included in the query base image B0 among the target query images, the second feature amount derivation unit 22B constituting the image encoding unit 22 encodes the query base image B0 to derive, as the second feature amount, at least one query normal feature amount indicating an image feature for an image in a case in which the finding included in the query base image B0 is a normal region.

The third feature amount derivation unit 22C constituting the image encoding unit 22 encodes the added finding label image F0 among the target query images to derive, as a third feature amount, at least one added finding feature amount indicating an image feature for the abnormality of the finding added to the query base image B0.

Further, in this embodiment, in a case in which the added finding label image F0 is not included in the query image Q0 among the target query images, the added finding feature amount derived as the third feature amount by the third feature amount derivation unit 22C is information indicating that no findings are included.

Therefore, the second feature amount derivation unit 22B and the third feature amount derivation unit 22C have an encoder and a latent model as the encoding learning model which has been trained to derive each of the second feature amount and the third feature amount in a case in which the target query images are input. The encoder and the latent model as the encoding learning model will be described below.

Next, the encoding of the reference image will be described. The first feature amount derivation unit 22A constituting the image encoding unit 22 encodes the reference image to derive, as a first feature amount, at least one reference finding feature amount indicating an image feature for the abnormality of the finding included in a target image. Further, in this embodiment, the reference image may not include any findings. In this case, the reference finding feature amount derived as the first feature amount by the first feature amount derivation unit 22A is information indicating that no findings are included.

The second feature amount derivation unit 22B constituting the image encoding unit 22 encodes the reference image to derive, as the second feature amount, at least one reference normal feature amount indicating an image feature for the image in a case in which the finding included in the reference image is a normal region. In addition, in a case in which the reference image does not include any findings, the second feature amount derivation unit 22B constituting the image encoding unit 22 derives, as the second feature amount, at least one reference normal feature amount indicating an image feature for a normal region that is included in a part in the reference image.

Therefore, the first feature amount derivation unit 22A and the second feature amount derivation unit 22B have an encoder and a latent model as the encoding learning model which has been trained to derive each of the first feature amount and the second feature amount in a case in which the reference image is input. Further, in this embodiment, it is assumed that the first feature amount derivation unit 22A and the second feature amount derivation unit 22B have a common encoding learning model. The encoder and the latent model as the encoding learning model will be described below.

Here, each of the added finding feature amount derived as the third feature amount from the target query image and the reference finding feature amount derived as the first feature amount from the reference image indicates an image feature for the abnormality of the finding included in the image. Therefore, the added finding feature amount and the reference finding feature amount can be compared to derive the similarity between the image features for the abnormalities of the findings included in the target query image and the reference image.

Meanwhile, each of the query normal feature amount derived as the second feature amount from the target query image and the reference normal feature amount derived as the second feature amount from the reference image indicates an image feature for the image in a case in which the finding included in the image is a normal region. Therefore, the query normal feature amount and the reference normal feature amount can be compared to derive the similarity between the image features for the target query image and the reference image in a case in which the findings included in the images are normal regions.

Therefore, the added finding feature amount derived as the third feature amount and the query normal feature amount derived as the second feature amount from the target query image can be compared with the reference finding feature amount derived as the first feature amount and the reference normal feature amount derived as the second feature amount from the reference image to derive the similarity between the query image and the reference image for the feature amount obtained by combining the image feature for the abnormality of the finding included in the image and the image feature in a case in which the finding included in the image is a normal region, that is, the similarity between the images in a case in which a desired finding is included in a desired normal region.

Meanwhile, training data used to train the encoding learning model and the decoding learning model consists of a training image and a training label image. The training label image indicates a region corresponding to the type of finding in the training image. In the following description, it is assumed that the query base image B0, the reference image, and the training image as image information are collectively referred to as target images. Further, it is assumed that the added finding label image F0, the training label image, and a finding label image V0 as label image information are referred to as target label images.

Furthermore, in this embodiment, it is assumed that the target image includes the brain and a finding is a region determined according to the type of brain disease, such as brain tumor, cerebral infarction, or cerebral hemorrhage. It is assumed that the target label image indicates a region determined according to the type of brain disease in the target image.

Here, the first feature amount indicates an image feature for the abnormality of the finding included in the target image. That is, the first feature amount indicates an image feature that enables the identification of a region, which is determined according to the type of brain disease, such as brain tumor, cerebral infarction, or cerebral hemorrhage, as a finding from normal tissues.

In addition, the second feature amount indicates an image feature for an image in a case in which the finding in the target image is a normal region. Therefore, the second feature amount indicates an image feature obtained by interpolating the finding in the target image, that is, a disease region, with an image feature of a region in which a disease is not present, particularly, the normal tissue of the brain. Therefore, the second image feature indicates the image feature of the image in a state in which all of the tissues of the brain in the target image are normal.

In addition, the third feature amount indicates an image feature to be included in the region which is determined according to the type of brain disease in the target image and which is indicated by the target label image.

Further, a combination of the first feature amount and the second feature amount may indicate the image feature of the target image, particularly, the image feature of the brain including the region determined according to the type of disease. In this case, the first feature amount indicates an image feature for the abnormality of the finding included in the target image and indicates an image feature representing the difference from the image feature in a case in which the finding included in the target image is a normal region. In this embodiment, since the finding is a brain disease, the first feature amount indicates an image feature representing the difference from the image feature of the image in a state in which all of the tissues of the brain in the target image are normal. Therefore, it is possible to separately acquire an image feature for the abnormality of the region determined according to the type of disease and an image feature of the image in a state in which all of the tissues of the brain are normal from the image of the brain which includes an abnormal region as the finding.

Further, in this embodiment, the third feature amount derived from the target label image by the training of the encoding learning model and the decoding learning model, which will be described below, approximates the first feature amount derived from the target image corresponding to the target label image. Therefore, a combination of the third feature amount and the second feature amount indicates the image feature of the target image, particularly, the image feature of the brain including the region determined according to the type of disease, similarly to the combination of the first feature amount and the second feature amount. In this case, the combination of the third feature amount and the second feature amount is obtained by adding, to the image feature of the image in a state in which all of the tissues of the brain in the target image are normal, the image feature indicating an abnormal region to be included in the image as a finding. Therefore, the combination of the third feature amount and the second feature amount makes it possible to acquire a combination of the image feature of the image including a desired finding and a desired normal tissue of the brain.

The segmentation unit 23A of the image decoding unit 23 derives the finding label image V0 corresponding to the type of the abnormality of the finding in the target image on the basis of the first feature amount derived by the first feature amount derivation unit 22A that has received the target image as an input.

The first reconstruction unit 23B of the image decoding unit 23 derives a first reconstructed image obtained by reconstructing the image feature for the image in a case in which the finding in the target image is a normal region, on the basis of the second feature amount derived by the second feature amount derivation unit 22B that has received the target image as an input.

The second reconstruction unit 23C of the image decoding unit 23 derives a second reconstructed image obtained by reconstructing the image feature of the target image on the basis of the first feature amount derived by the first feature amount derivation unit 22A and the second feature amount derived by the second feature amount derivation unit 22B that have the target image as an input. In addition, the reconstructed image feature of the target image is an image feature including a background other than the brain included in the target image.

Therefore, the segmentation unit 23A, the first reconstruction unit 23B, and the second reconstruction unit 23C have a decoder as the decoding learning model which has been trained to derive the finding label image V0 corresponding to the type of the abnormality of the finding in a case in which the first feature amount and the second feature amount are input and to derive the first reconstructed image and the second reconstructed image.

Figure 6:
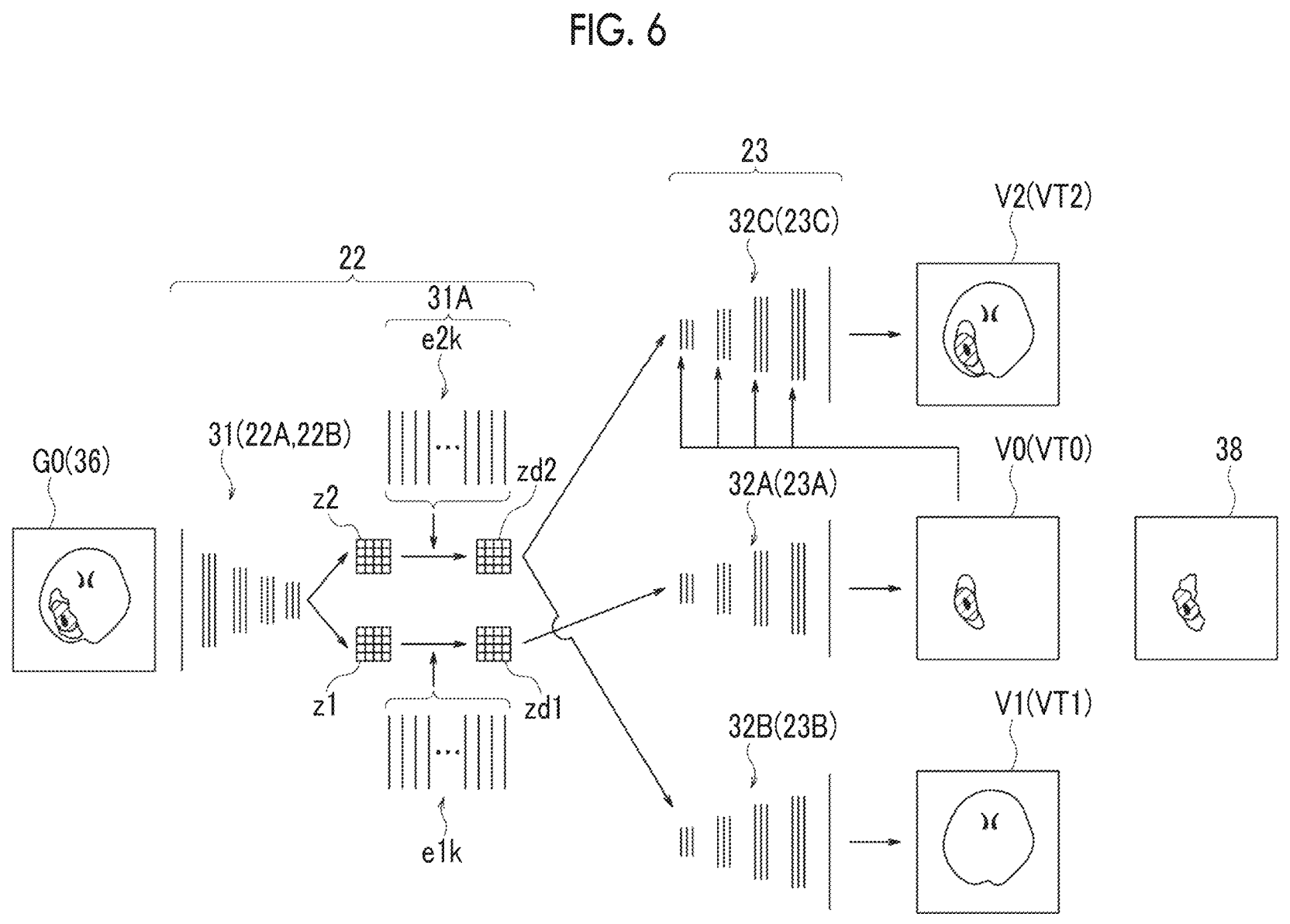
Figures 7, 8:
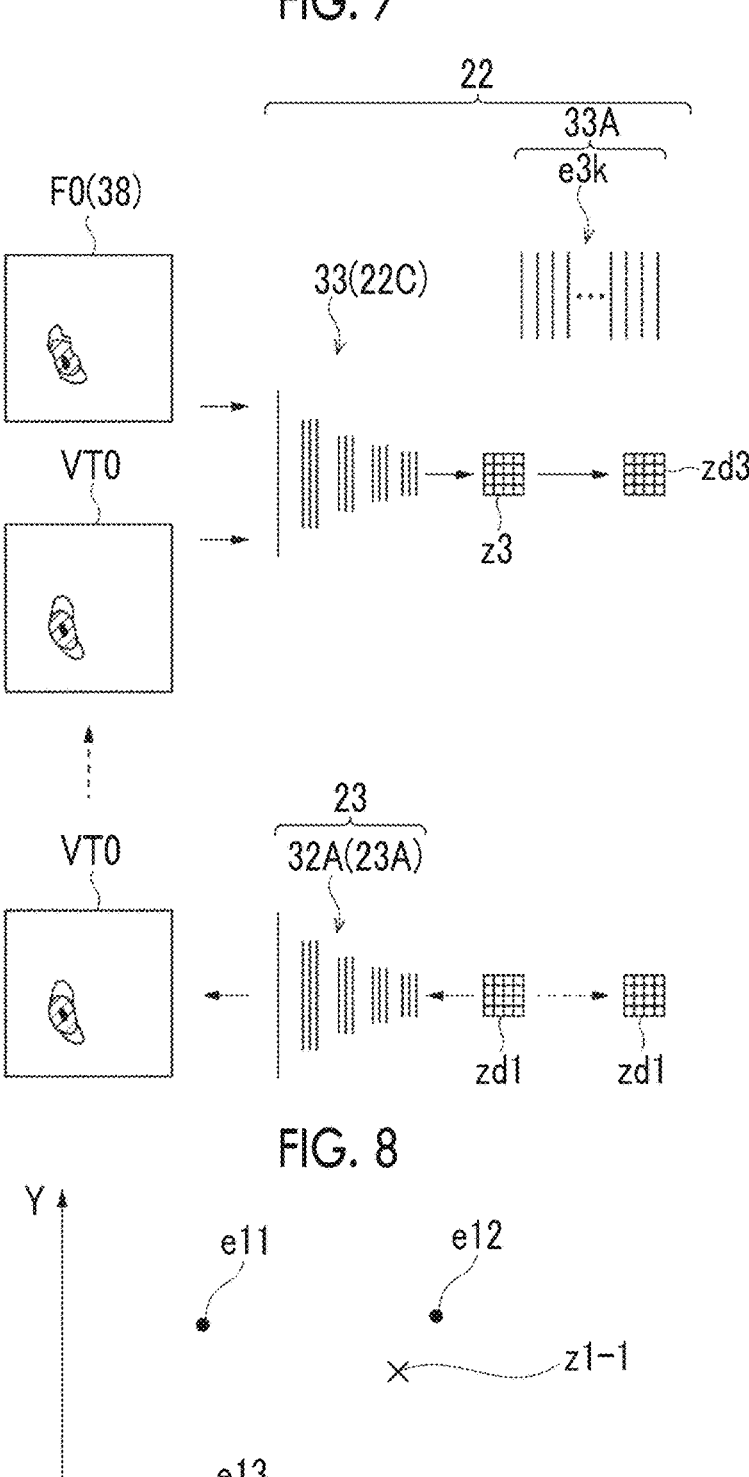
FIG. 7 is a conceptual diagram illustrating the processes performed by the image encoding unit and the image decoding unit.
FIG. 8 is a diagram illustrating substitution with a first feature vector.

FIGS. 6 and 7 are conceptual diagrams illustrating processes performed by the image encoding unit 22 and the image decoding unit 23. As illustrated in FIGS. 6 and 7, the image encoding unit 22 includes an encoder 31 and a latent model 31A, which are a first encoding learning model, and a label encoder 33 and a latent model 33A which are a second encoding learning model.

Here, the encoder 31 and the latent model 31A, which are the first encoding learning model, receive the input of the image information, that is, the target image and function as the first feature amount derivation unit 22A and the second feature amount derivation unit 22B according to this embodiment. Meanwhile, the label encoder 33 and the latent model 33A, which is the second encoding learning model, receives the input of the label image, that is, the target label image, and functions as the third feature amount derivation unit 22C according to this embodiment.

In addition, the image decoding unit 23 includes decoders 32A to 32C which are the decoding learning model. The decoders 32A to 32C have the functions of the segmentation unit 23A, the first reconstruction unit 23B, and the second reconstruction unit 23C, respectively. Further, the decoder 32A illustrated in FIG. 7 and the decoder 32A illustrated in FIG. 6 are the same. However, in FIG. 7, for the sake of description, input and output directions are opposite to those in FIG. 6.

The encoder 31 and the latent model 31A as the first encoding learning model and the decoders 32A to 32C as the decoding learning model are constructed by performing machine learning using, as the training data, a combination of a training image which has the brain including a finding as an object and a training label image which corresponds to the region determined according to the type of brain disease in the training image. The encoder 31 and the decoders 32A to 32C consist of, for example, a convolutional neural network (CNN) which is one of multilayer neural networks in which a plurality of processing layers are hierarchically connected. Further, the latent model 31A is trained using a vector quantised-variational auto-encoder (VQ-VAE) method.

The VQ-VAE is a method that is proposed in "Neural Discrete Representation Learning, Aaron van den Oord et al., Advances in Neural Information Processing Systems 30 (NIPS), 6306-6315, 2017" and that receives a latent variable indicating features of input data encoded by a feature amount extractor (that is, an encoder), quantizes the received latent variable, transmits the quantized latent variable to a feature amount decoder (that is, a decoder), and learns the quantization process of the latent variable according to whether or not the original input data has been reconstructed correctly. The learning will be described below.

In addition, the latent model 31A can be trained using any method, such as an auto-encoder method, a variational auto-encoder (VAE) method, a generative adversarial network (GAN) method, or a bidirectional GAN (BiGAN) method, instead of the VQ-VAE.

The convolutional neural network constituting the encoder 31 consists of a plurality of processing layers. Each processing layer is a convolution processing layer and performs a convolution process using various kernels while down-sampling an image input from a processing layer in the previous stage. The kernel has a predetermined pixel size (for example, $3 \times 3$), and a weight is set for each element. Specifically, a weight, such as a differential filter that enhances the edge of an input image in the previous stage, is set. Each processing layer applies the kernel to the input image or the entire feature amount output from the processing layer in the previous stage while shifting the pixel of interest of the kernel and outputs a feature map. Further, the processing layer in the later stage in the encoder 31 outputs a feature map with lower resolution. Therefore, the encoder 31 compresses (that is, dimensionally compresses) the features of an input target image (represented by G0) such that the resolution of the feature map is reduced to encode the target image and outputs two latent variables, that is, a first latent variable z1 and a second latent variable z2. The first latent variable z1 indicates an image feature for the abnormality of the finding in the target image G0, and the second latent variable z2 indicates an image feature for an image in a case in which the finding in the target image G0 is a normal region.

Each of the first and second latent variables z1 and z2 consists of $n \times n$ D-dimensional vectors. In FIG. 6, for example, n is 4, and the first and second latent variables z1 and z2 can be represented as an $n \times n$ map in which each position consists of a D-dimensional vector. In addition, the number of dimensions of the vectors and the number of vectors may be different between the first latent variable z1 and the second latent variable z2. Here, the first latent variable z1 corresponds to a feature vector indicating the image feature for the anomaly of the finding. In addition, the second latent variable z2 corresponds to a feature vector indicating the image feature for the image in a case in which the finding included in the target image G0 is a normal region.

Here, in this embodiment, in the latent model 31A, K first D-dimensional feature vectors e1k indicating a representative image feature for the abnormality of the finding are prepared in advance for the first latent variable z1. In addition, in the latent model 31A, K second D-dimensional feature vectors e2k indicating a representative image feature for the image in a case in which the finding is a normal region are prepared in advance for the second latent variable z2. Further, the first feature vectors e1k and the second feature vectors e2k are stored in the storage 13. Further, the number of first feature vectors e1k prepared and the number of second feature vectors e2k prepared may be different from each other. The prepared second feature vector e2k is an example of a normal feature vector.

The image encoding unit 22 substitutes each of the n×n D-dimensional vectors included in the first latent variable z1 with the first feature vector e1k in the latent model 31A. In this case, each of the n×n D-dimensional vectors included in the first latent variable z1 is substituted with the first feature vector e1k having the minimum difference in a D-dimensional vector space. FIG. 8 is a diagram illustrating the substitution with the first feature vector. In addition, in FIG. 8, for ease of explanation, the latent variable vectors are two-dimensionally illustrated. Further, in FIG. 8, it is assumed that four first feature vectors e11 to e14 are prepared. As illustrated in FIG. 8, one latent variable vector z1-1 included in the first latent variable z1 has the minimum difference from the first feature vector e12 in the vector space. Therefore, the vector z1-1 is substituted with the first feature vector e12. Further, for the second latent variable z2, similarly to the first latent variable z1, each of the n×n D-dimensional vectors is substituted with any one of the second feature vectors e2k.

As described above, the first latent variable z1 is represented by a combination of a maximum of K latent variables having n×n predetermined values by substituting each of the n×n D-dimensional vectors included in the first latent variable z1 with the first feature vector e1k. Therefore, first latent variables zd1 are quantized and distributed in a D-dimensional latent space.

Further, the second latent variable z2 is represented by a combination of a maximum of K latent variables having n×n predetermined values by substituting each of the n×n D-dimensional vectors included in the second latent variable z2 with the second feature vector e2k. Therefore, second latent variables zd2 are quantized and distributed in the D-dimensional latent space.

Reference numerals zd1 and zd2 are used as the quantized first and second latent variables. In addition, the quantized first and second latent variables zd1 and zd2 can also be represented as an n×n map in which each position consists of a D-dimensional vector. The quantized first and second latent variables zd1 and zd2 correspond to the first feature amount and the second feature amount, respectively.

The convolutional neural network constituting the decoders 32A to 32C consists of a plurality of processing layers. Each processing layer is a convolution processing layer and performs a convolution process using various kernels while up-sampling the feature amount input from the processing layer in the previous stage in a case in which the first and second latent variables zd1 and zd2 are input as the first and second feature amounts. Each processing layer applies the kernel to the entire feature map consisting of the feature amount output from the processing layer in the previous stage while shifting the pixel of interest of the kernel. Further, the processing layer in the later stage in the decoders 32A to 32C outputs a feature map with higher resolution. In addition, the decoders 32A to 32C do not perform the process in a case in which the image search device searches for a similar image as will be described below. However, here, the process performed in the decoders 32A to 32C will be described using the first and second latent variables zd1 and zd2 derived from the target image G0 by the image encoding unit 22 since it is required for a learning process which will be described below.

In this embodiment, the first latent variable zd1 is input to the decoder 32A. The decoder 32A derives the finding label image V0 corresponding to the type of the abnormality of the finding in the target image G0 input to the encoder 31 on the basis of the first latent variable zd1.

The second latent variable zd2 is input to the decoder 32B. The decoder 32B derives a first reconstructed image V1 obtained by reconstructing the image feature for the image in a case in which the finding included in the target image G0 input to the encoder 31 is a normal region, on the basis of the second latent variable zd2. Therefore, even in a case in which the target image G0 includes the finding, the first reconstructed image V1 does not include the finding. As a result, the brain included in the first reconstructed image V1 consists of only normal tissues.

The second latent variable zd2 is input to the decoder 32C. In addition, the finding label image V0 having a size corresponding to the resolution of each processing layer is collaterally input to each processing layer of the decoder 32C. Specifically, a feature map of the finding label image V0 having a size corresponding to the resolution of each processing layer is collaterally input. In addition, the feature map that is collaterally input may be derived by reducing the feature map output from the processing layer immediately before the finding label image V0 is derived in the decoder 32A to a size corresponding to the resolution of each processing layer of the decoder 32C. Alternatively, the feature map having the size corresponding to the resolution of each processing layer, which has been derived in the process in which the decoder 32A derives the finding label image V0, may be input to each processing layer of the decoder 32C. In the following description, it is assumed that the feature map output from the processing layer immediately before the derivation of the finding label image V0 is reduced to a size corresponding to the resolution of each processing layer of the decoder 32C and then collaterally input to each processing layer of the decoder 32C.

Here, the finding label image V0 and the feature map are derived on the basis of the first latent variable zd1. Therefore, the decoder 32C derives a second reconstructed image V2 obtained by reconstructing the image feature of the input target image G0 on the basis of the first and second latent variables zd1 and zd2. Therefore, the second reconstructed image V2 is obtained by adding the image feature for the abnormality of the region determined according to the type of disease, which is based on the first latent variable zd1, to the image feature for the brain consisting of only the normal tissues included in the first reconstructed image V1 which is based on the second latent variable zd2. Therefore, the second reconstructed image V2 is obtained by reconstructing the image feature of the input target image G0.

Meanwhile, the label encoder 33 and the latent model 33A as the second encoding learning model are constructed by performing machine learning on the neural network, using, for example, a finding label image including only the region of the finding as the training data. The training data for training the label encoder 33 and the latent model 33A will be described below. The label encoder 33 consists of a convolutional neural network similarly to the encoder 31. Further, the latent model 33A is trained using the VQ-VAE method similarly to the latent model 31A.

In this embodiment, in a case in which similar images are searched for, the added finding label image F0 constituting the query image Q0 is input to the label encoder 33. The label encoder 33 compresses (that is, dimensionally compresses) the features of the input added finding label image F0 such that the resolution of the feature map is reduced to encode the added finding label image F0 and outputs a third latent variable z3. The third latent variable z3 indicates an image feature for the abnormality of the added finding.

The third latent variable z3 consists of $n \times n$ D-dimensional vectors, similarly to the first and second latent variables z1 and z2. In FIG. 7, for example, n is 4, and the third latent variable z3 can be represented as an $n \times n$ map in which each position consists of a D-dimensional vector. In addition, the third latent variable z3 and the first latent variable z1 need to have the same number of dimensions of the vectors and the same number of vectors. In addition, the third latent variable z3 and the second latent variable z2 may have different numbers of dimensions of the vectors and different numbers of vectors. Here, the third latent variable z3 corresponds to an added finding feature vector indicating the image feature for the added finding.

Here, in this embodiment, in the latent model 33A, K third D-dimensional feature vectors $e3k$ indicating a representative image feature for the abnormality of the finding are prepared in advance for the third latent variable z3. In addition, the third feature vector $e3k$ is also stored in the storage 13. Further, the prepared third feature vector $e3k$ may be the same as or different from the first feature vector $e1k$. Further, the number of third feature vectors $e3k$ prepared may be different from the number of first feature vectors $e1k$ and the number of second feature vectors $e2k$. The prepared third feature vector $e3k$ is an example of a finding feature vector.

The image encoding unit 22 substitutes each of the $n \times n$ D-dimensional vectors included in the third latent variable z3 with the third feature vector $e3k$ in the latent model 33A. In this case, each of the $n \times n$ D-dimensional vectors included in the third latent variable z3 is substituted with the third feature vector $e3k$ having the minimum difference in a D-dimensional vector space, similarly to the first and second latent variables. As described above, the third latent variable z3 is represented by a combination of a maximum of K latent variables having $n \times n$ predetermined values by substituting each of the $n \times n$ D-dimensional vectors included in the third latent variable z3 with the third feature vector $e3k$. Therefore, the third latent variable zd3 is quantized and distributed in a D-dimensional latent space.

A reference numeral zd3 is used as the quantized third latent variable. In addition, the quantized third latent variable zd3 can also be represented as an $n \times n$ map in which each position consists of a D-dimensional vector. The quantized third latent variable zd3 derived for the added finding label image F0 is an example of the added finding feature amount.

Figure 9:
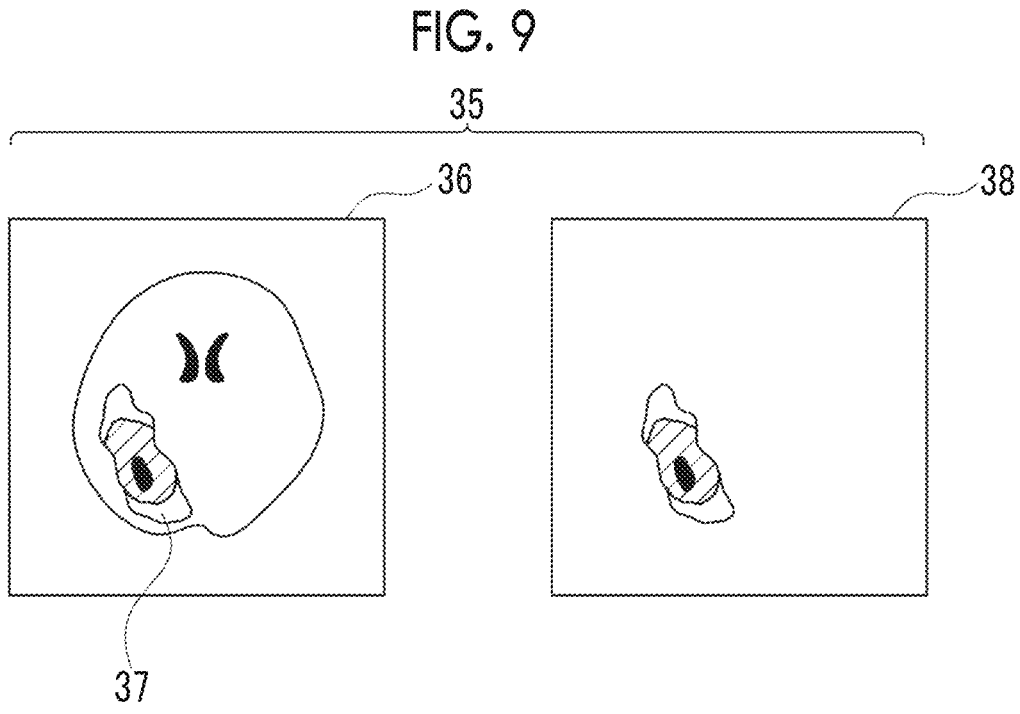
FIG. 9 is a diagram illustrating an example of training data used for learning.

The learning unit 24 trains the encoder 31 and the latent model 31A of the image encoding unit 22, the decoders 32A to 32C of the image decoding unit 23, and the label encoder 33 and the latent model 33A of the image encoding unit 22. FIG. 9 is a diagram illustrating an example of the training data used to train the encoder 31 and the latent model 31A of the image encoding unit 22 and the decoders 32A to 32C of the image decoding unit 23. As illustrated in FIG. 9, training data 35 includes a training image 36 of the brain including a finding 37, such as tumor, infarction, or hemorrhage, and a training label image 38 corresponding to the type of the abnormality of the finding in the training image 36. The training data used to train the label encoder 33 and the latent model 33A will be described below.

The learning unit 24 inputs the training image 36 to the encoder 31 and directs the encoder 31 to output the first latent variable z1 and the second latent variable z2 for the training image 36. In addition, in the following description, it is assumed that reference numerals z1 and z2 are also used for the first latent variable and the second latent variable for the training image 36, respectively.

Then, the learning unit 24 substitutes the latent variable vectors included in the first latent variable z1 and in the second latent variable z2 with the first and second feature vectors in the latent model 31A to acquire the quantized first and second latent variables zd1 and zd2. Further, in the following description, it is assumed that reference numerals zd1 and zd2 are also used for the first and second latent variables quantized for the training image 36, respectively. The first and second latent variables zd1 and zd2 quantized for the training image 36 correspond to a first learning feature amount and a second learning feature amount, respectively.

Then, the learning unit 24 inputs the first latent variable zd1 to the decoder 32A to derive a learning finding label image VT0 corresponding to the type of the abnormality of the finding 37 included in the training image 36. In addition, the learning unit 24 inputs the second latent variable zd2 to the decoder 32B to derive a first learning reconstructed image VT1 obtained by reconstructing the image feature for the image in a case in which the finding 37 included in the training image 36 is a normal region. Further, the learning unit 24 inputs the second latent variable zd2 to the decoder 32C and collaterally inputs the learning finding label image VT0 having a size corresponding to the resolution of each processing layer, specifically, the feature map of the learning finding label image VT0, to each processing layer of the decoder 32C to derive a second learning reconstructed image VT2 obtained by reconstructing the image feature for the training image 36. In addition, in a case in which the second learning reconstructed image VT2 is derived, the feature map output from the processing layer immediately before the learning finding label image VT0 is derived may be reduced to a size corresponding to the resolution of each processing layer of the decoder 32C and then collaterally input to each processing layer of the decoder 32C.

Figure 10:
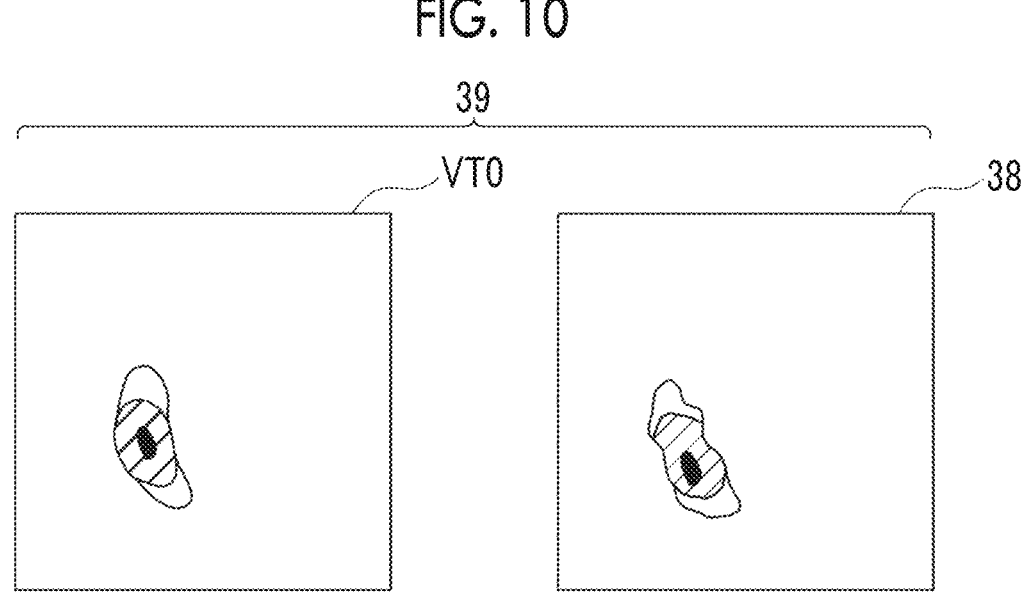
FIG. 10 is a diagram illustrating an example of training data used for learning.

FIG. 10 is a diagram illustrating an example of the training data used to train the label encoder 33 and the latent model 33A. As illustrated in FIG. 10, training data 39 includes the training label image 38 included in the training data 35 and the learning finding label image VT0 output from the decoder 32A. Here, in a case in which the learning finding label image VT0 is used to train the label encoder 33 and the latent model 33A, it is assumed that the learning finding label image VT0 is referred to as a training label image. Therefore, the learning unit 24 holds a copy of the learning finding label image VT0 in the memory 16 to be added as a training finding label image to the training data 39. In FIG. 7, a broken line indicates that the learning finding label image VT0 is copied and used as the training finding label image. In addition, it is assumed that the training label image is denoted by the same reference numeral VT0 as the learning finding label image. Further, in the training of the label encoder 33 and the latent model 33A, the first latent variable zd1 input to the decoder 32A in a case in which the training finding label image VT0 has been derived is used as a first training feature amount. Therefore, the learning unit 24 holds a copy of the quantized first latent variable zd1 as the first training feature amount in the memory 16. In FIG. 7, a broken line indicates that the first latent variable zd1 is copied and used as the first training feature amount. In addition, it is assumed that the reference numeral zd1 is also used for the first training feature amount.

The training data 39 used to train the label encoder 33 and the latent model 33A may include only one of the training label image 38 included in the training data 35 and the training finding label image VT0 derived from the training image 36. However, as the number of images used to train the label encoder 33 and the latent model 33A is larger, the training can be more effectively performed. Therefore, it is preferable that the training data 39 includes both the training label image 38 included in the training data 35 and the training finding label image VT0 derived from the training image 36.

The learning unit 24 inputs the training label image 38 to the label encoder 33 and directs the label encoder 33 to output the third latent variable z3 for the training label image 38. Further, the learning unit 24 inputs the training finding label image VT0 to the label encoder 33 and directs the label encoder 33 to output the third latent variable z3 for the training finding label image VT0. In addition, in the following description, it is assumed that the reference numeral z3 is also used for the third latent variable for the training data 39. Further, the same learning process is performed in a case in which the training finding label image VT0 is input to the label encoder 33 and in a case in which the training label image 38 is input to the label encoder 33. Therefore, here, a process in a case in which the training label image 38 is input to the label encoder 33 will be described.

Then, the learning unit 24 substitutes each latent variable vector included in the third latent variable z3 with the third feature vector in the latent model 33A to acquire the quantized third latent variable zd3. Further, in the following description, it is assumed that the reference numeral zd3 is also used for the third latent variable used for learning. The quantized third latent variable zd3 derived for the training data 39 is used as a third learning feature amount.

The learning unit 24 derives a difference between the first latent variable zd1, which is the first learning feature amount, and a predetermined probability distribution of the first feature amount as a first loss L1. Here, the predetermined probability distribution of the first feature amount is a probability distribution that the first latent variable zd1 needs to follow. In a case in which the VQ-VAE method is used, a code word loss and a commitment loss are derived as the first loss L1. The code word loss is a value to be taken by a code word which is a representative local feature in the probability distribution of the first feature amount. The commitment loss is a distance between the first latent variable zd1 and a code word closest to the first latent variable zd1. The encoder 31 and the latent model 31A are trained such that the first latent variable zd1 corresponding to a predetermined probability distribution of the first feature amount is acquired by the first loss L1.

In addition, the learning unit 24 derives a difference between the second latent variable zd2, which is the second learning feature amount, and a predetermined probability distribution of the second feature amount as a second loss L2. Here, the predetermined probability distribution of the second feature amount is a probability distribution that the second latent variable zd2 needs to follow. In a case in which the VQ-VAE method is used, a code word loss and a commitment loss are derived as the second loss L2, similarly to the first loss L1. The code word loss for the second latent variable zd2 is a value to be taken by a code word which is a representative local feature in the probability distribution of the second feature amount. The commitment loss for the second latent variable zd2 is a distance between the second latent variable zd2 and a code word closest to the second latent variable zd2. The encoder 31 and the latent model 31A are trained such that the second latent variable zd2 corresponding to a predetermined probability distribution of the second feature amount is acquired by the second loss L2.

In addition, the learning unit 24 derives, as a third loss L3, the difference between the training label image 38 corresponding to the type of the abnormality of the finding 37 included in the training image 36 and the learning finding label image VT0 as semantic segmentation for the training image.

The "difference as semantic segmentation" is an index that is determined on the basis of the overlap between a region corresponding to the type of abnormality represented by the training label image 38 and a region corresponding to the type of abnormality represented by the learning finding label image VT0. Specifically, the value of twice the number of elements which are common to the training label image 38 and the learning finding label image VT0 with respect to the sum of the number of elements of the training label image 38 and the number of elements of the learning finding label image VT0 can be used as the difference as semantic segmentation, that is, the third loss L3.

In addition, the learning unit 24 derives the difference between a region other than the finding 37 included in the training image 36 and the first learning reconstructed image VT1 as a fourth loss L4. Specifically, the learning unit 24 derives the difference between a region obtained by removing the finding 37 from the training image 36 and the first learning reconstructed image VT1 as the fourth loss L4.

Further, the learning unit 24 derives the difference between the training image 36 and the second learning reconstructed image VT2 as a fifth loss L5.

Further, the learning unit 24 derives the second latent variable zd2 which is the second learning feature amount such that the second latent variable zd2 includes the image feature in a case in which the finding 37 in the training image 36 is a normal region and does not include the image feature for the finding 37 in the training image 36. Specifically, the learning unit 24 derives, as a sixth loss L6, the difference between a distribution of the second latent variable zd2 derived from the training image 36 that does not include the finding 37, which is an ideal distribution, and a distribution of the second latent variable zd2 derived from the training image 36 including the finding 37, using a Wasserstein GAN (Proceedings of the 34th International Conference on Machine Learning, PMLR 70:214-223, 2017) method.

Similarly to the encoder 31 and the label encoder 33, a neural network that is called a critic network is constructed as a convolutional neural network by the Wasserstein GAN method. A plurality of second latent variables zd2 derived from a plurality of training images 36 that do not include the finding 37 and a plurality of second latent variables zd2 derived from a plurality of training images 36 that include the finding 37 are input to the critic network. Then, the critic network calculates, as a Wasserstein distance, the difference between a distribution of the second latent variable zd2 derived from the training image 36 that does not include the finding 37 and a distribution of the second latent variable zd2 derived from the training image 36 that includes the finding 37. In this case, a constraint term may be added such that the critic network has a unit gradient norm at all of points included in the distribution of the second latent variable zd2 derived from the training image 36 that does not include the finding 37 and the distribution of the second latent variable zd2 derived from the training image 36 that includes the finding 37.

In addition, the learning unit 24 derives a difference between the third latent variable zd3, which is the third learning feature amount, and a predetermined probability distribution of the third feature amount as a seventh loss L7.

Here, the predetermined probability distribution of the third feature amount is a probability distribution that the third latent variable zd3 needs to follow. In a case in which the VQ-VAE method is used, a code word loss and a commitment loss are derived as the seventh loss L7, similarly to the first loss L1. The code word loss for the third latent variable zd3 is a value to be taken by a code word which is a representative local feature in the probability distribution of the third feature amount. The commitment loss for the third latent variable zd3 is a distance between the third latent variable zd3 and a code word closest to the third latent variable zd3. The label encoder 33 and the latent model 33A are trained such that the third latent variable zd3 corresponding to the predetermined probability distribution of the third feature amount is acquired by the seventh loss L7.

Further, the learning unit 24 derives the difference between the third latent variable zd3 and the first training feature amount zd1 as an eighth loss L8.

Here, as the first latent variable zd1 acquired by the encoder 31 and by the latent model 31A more closely follows a predetermined probability distribution of the first feature amount, the encoder 31 can output the more preferable first latent variable z1 that can faithfully reproduce the abnormality of the finding 37 included in the training image 36. In addition, the more preferably quantized first latent variable zd1 can be acquired by the latent model 31A.

Further, as the second latent variable zd2 acquired by the encoder 31 and by the latent model 31A more closely follows a predetermined probability distribution of the second feature amount, the encoder 31 can output the more preferable second latent variable z2 that can faithfully reproduce the image in a case in which the finding 37 included in the training image 36 is a normal region. In addition, the more preferably quantized second latent variable zd2 can be acquired by the latent model 31A.

Further, since the learning finding label image VT0 output from the decoder 32A is derived on the basis of the first latent variable zd1, the learning finding label image VT0 is not completely matched with the training label image 38. Furthermore, the learning finding label image VT0 is not completely matched with the finding 37 included in the training image 36. However, as the difference between the learning finding label image VT0 and the training label image 38 as semantic segmentation for the training image 36 is smaller, the encoder 31 can output the more preferable first latent variable z1 in a case in which the target image G0 is input. That is, it is possible to output the first latent variable z1 that potentially includes information indicating where the finding is in the target image G0 and the image feature for the abnormality of the finding. In addition, the more preferably quantized first latent variable zd1 can be acquired by the latent model 31A. Therefore, the first latent variable zd1 indicating the image feature for the abnormality of the finding is derived while the finding is being extracted from the target image G0 by the encoder 31. In addition, the decoder 32A can output the finding label image V0 corresponding to the type of the abnormality of the finding, for the region corresponding to the finding included in the target image.

Further, since the first learning reconstructed image VT1 output from the decoder 32B is derived on the basis of the second latent variable zd2, the first learning reconstructed image VT1 is not completely matched with the image feature for the image in a case in which the finding 37 included in the training image 36 is a normal region. However, as the difference between the first learning reconstructed image VT1 and a region other than the finding 37 in the training image 36 is smaller, the encoder 31 can output the more preferable second latent variable z2 in a case in which the target image G0 is input. In addition, the more preferably quantized second latent variable zd2 can be acquired by the latent model 31A. Further, the decoder 32B can output the first reconstructed image V1 that is closer to the image for the image in a case in which the finding included in the target image G0 is a normal region.

Furthermore, since the second learning reconstructed image VT2 output from the decoder 32C is derived on the basis of the first latent variable zd1 and the second latent variable zd2, the second learning reconstructed image VT2 is not completely matched with the training image 36. However, as the difference between the second learning reconstructed image VT2 and the training image 36 becomes smaller, the encoder 31 can output the more preferable first and second latent variables z1 and z2 in a case in which the target image G0 is input. In addition, the more preferably quantized first latent variable zd1 and second latent variable zd2 can be acquired by the latent model 31A. Further, the decoder 32C can output the second reconstructed image V2 that is closer to the target image G0.

Further, for the second latent variable zd2 acquired by the encoder 31 and the latent model 31A, the distribution (referred to as a distribution without a finding) in a case in which the second latent variable zd2 is derived from the training image 36 that does not include the finding 37 and the distribution (referred to as a distribution with a finding) in a case in which the second latent variable zd2 is derived from the training image 36 that includes the finding 37 are affected by a difference in image features depending on whether the finding 37 is present or absent. Therefore, the distribution without a finding and the distribution with a finding are not completely matched with each other. However, in a case in which the distribution without a finding is regarded as an ideal distribution, as the difference between the distribution without a finding and the distribution with a finding is smaller, the second latent variable zd2 derived from the training image 36 including the finding 37 is more likely to include only the image feature for the image in a case in which the finding 37 included in the training image 36 is a normal region, without including the image feature of the finding 37 included in the training image 36. This makes it possible to acquire the preferable second latent variable zd2. Therefore, the encoder 31 can output the preferable second latent variable z2 that can faithfully reproduce the image in a case in which the finding 37 included in the training image 36 is a normal region.

Further, as the third latent variable zd3 acquired by the label encoder 33 and the latent model 33A more closely follows a predetermined probability distribution of the third feature amount, the label encoder 33 and the latent model 33A can output the more preferable third latent variable z3 that can faithfully reproduce the abnormality of the finding included in the training label image 38 or the training finding label image. In addition, the latent model 33A can acquire the more preferably quantized third latent variable zd3.

In addition, as the difference between the third latent variable zd3 acquired by the label encoder 33 and the latent model 33A and the first training feature amount zd1 is smaller, the third latent variable z3 indicating the abnormality of the finding included in the training label image 38 or the training finding label image VT0, which has been derived from the label encoder 33 and the latent model 33A, is closer to the first latent variable zd1 indicating the image feature for the abnormality of the finding included in the target image G0 which has been derived from the encoder 31 and the latent model 31A. Therefore, it is possible to estimate and acquire, from the label encoder 33 and the latent model 33A, the first latent variable zd1 indicating the image feature of the finding 37 to be included in the training image 36 which corresponds to the abnormality of the finding included in the training label image 38 or the training finding label image VT0.

Therefore, the learning unit 24 trains the encoder 31, the latent model 31A, the decoders 32A to 32C, the label encoder 33, and the latent model 33A on the basis of at least one of the first to eighth losses L1 to L8 derived as described above. In this embodiment, the learning unit 24 trains the encoder 31, the latent model 31A, the decoders 32A to 32C, the label encoder 33, and the latent model 33A such that all of the losses L1 to L8 satisfy predetermined conditions. That is, the encoder 31, the latent model 31A, and the decoders 32A to 32C are trained by updating, for example, the number of processing layers and the number of pooling layers constituting the encoder 31, the latent model 31A, and the decoders 32A to 32C, coefficients of the kernels in the processing layers, the sizes of the kernels, weights for the connections between the layers, the first feature vector e1$k$, and the second feature vector e2$k$ such that the first to sixth losses L1 to L6 are reduced. In addition, for the label encoder 33 and the latent model 33A, the learning unit 24 trains the label encoder 33 and the latent model 33A by updating, for example, the number of processing layers and the number of pooling layers constituting the label encoder 33 and the latent model 33A, coefficients of the kernels in the processing layers, the sizes of the kernels, weights for the connections between the layers, and the third feature vector e3$k$ such that the seventh and eighth losses L7 and L8 are reduced.

Further, in this embodiment, the learning unit 24 trains the encoder 31, the latent model 31A, the decoders 32A to 32C, the label encoder 33, and the latent model 33A such that the first loss L1 is equal to or less than a predetermined threshold value Th1, the second loss L2 is equal to or less than a predetermined threshold value Th2, the third loss L3 is equal to or less than a predetermined threshold value Th3, the fourth loss L4 is equal to or less than a predetermined threshold value Th4, the fifth loss L5 is equal to or less than a predetermined threshold value Th5, the sixth loss L6 is equal to or less than a predetermined threshold value Th6, the seventh loss L7 is equal to or less than a predetermined threshold value Th7, and the eighth loss L8 is equal to or less than a predetermined threshold value Th8. In addition, instead of the training using the threshold value, the training may be performed a predetermined number of times, or the training may be performed such that each of the losses L1 to L8 has the minimum value or the maximum value.

In a case in which the learning unit 24 trains the encoder 31, the latent model 31A, the decoders 32A to 32C, the label encoder 33, and the latent model 33A in this way, the encoder 31 outputs the first latent variable z1 that more appropriately indicates the image feature for the abnormality of the finding of the brain included in the input target image G0. In addition, the encoder 31 outputs the second latent variable z2 that more appropriately indicates the image feature of the brain in a case in which the finding is a normal region in the brain included in the input target image G0. Further, the latent model 31A acquires the quantized first latent variable zd1 that more appropriately indicates the image feature indicating the abnormality of the finding of the brain included in the input target image G0. Furthermore, the latent model 31A acquires the quantized second latent variable zd2 that more appropriately indicates the image feature of the brain in a case in which the finding is a normal region in the brain included in the input target image G0.

In addition, in a case in which the quantized first latent variable zd1 is input, the decoder 32A outputs the finding label image V0 that more accurately indicates semantic segmentation corresponding to the type of the abnormality of the finding included in the target image G0. Further, in a case in which the quantized second latent variable zd2 is input, the decoder 32B outputs the first reconstructed image V1 obtained by reconstructing the image feature of the brain in a case in which the finding is a normal region in the target image G0. Furthermore, in a case in which the quantized second latent variable zd2 is input and the finding label image V0 is collaterally input to each processing layer, the decoder 32C adds the image feature for the abnormality of the region determined according to the type of disease based on the first latent variable zd1 to the image feature of the brain consisting of only the normal tissues included in the first reconstructed image V1 based on the second latent variable zd2. As a result, the decoder 32C outputs the second reconstructed image V2 obtained by reconstructing the image feature of the brain including the finding.

In addition, in a case in which the added finding label image F0 is input, the label encoder 33 outputs the third latent variable z3 that more appropriately indicates the image feature for the abnormality of the finding of the brain included in the added finding label image F0. Furthermore, the latent model 33A outputs the quantized third latent variable zd3 that more appropriately indicates the image feature indicating the abnormality of the finding of the brain included in the added finding label image F0. Further, the third latent variable zd3 derived in this process is an estimated value of the first latent variable zd1 indicating the image feature for the abnormality of the finding of the brain included in the image corresponding to the added finding label image F0.

In a case in which the query image Q0 is derived and the user selects the search execution button 44 of the search screen 40, the similarity derivation unit 25 derives the similarities between the query image Q0 and all of the reference images registered in the image database DB in order to search for a similar reference image that is similar to the query image Q0 (that is, the target image G0) derived by the query image derivation unit 21 among the reference images registered in the image database DB stored in the image storage server 3. Here, a plurality of reference images for various cases of the brain are registered in the image database DB. In this embodiment, for the reference images, the quantized first and second latent variables are derived in advance by the image encoding unit 22 including the trained encoder 31 and are registered in the image database DB in association with the reference images. The first and second latent variables registered in the image database DB in association with the reference images are referred to as first and second reference latent variables, respectively. In addition, the first reference latent variable is an example of the reference finding feature amount, and the second reference latent variable is an example of the reference normal feature amount.

Hereinafter, the derivation of the similarity by the similarity derivation unit 25 will be described. In this embodiment, the query image Q0 includes the finding that has been added to the query base image B0 by the user. The similarity derivation unit 25 derives the similarity between the query image Q0 and the reference image.

Figures 11, 12:
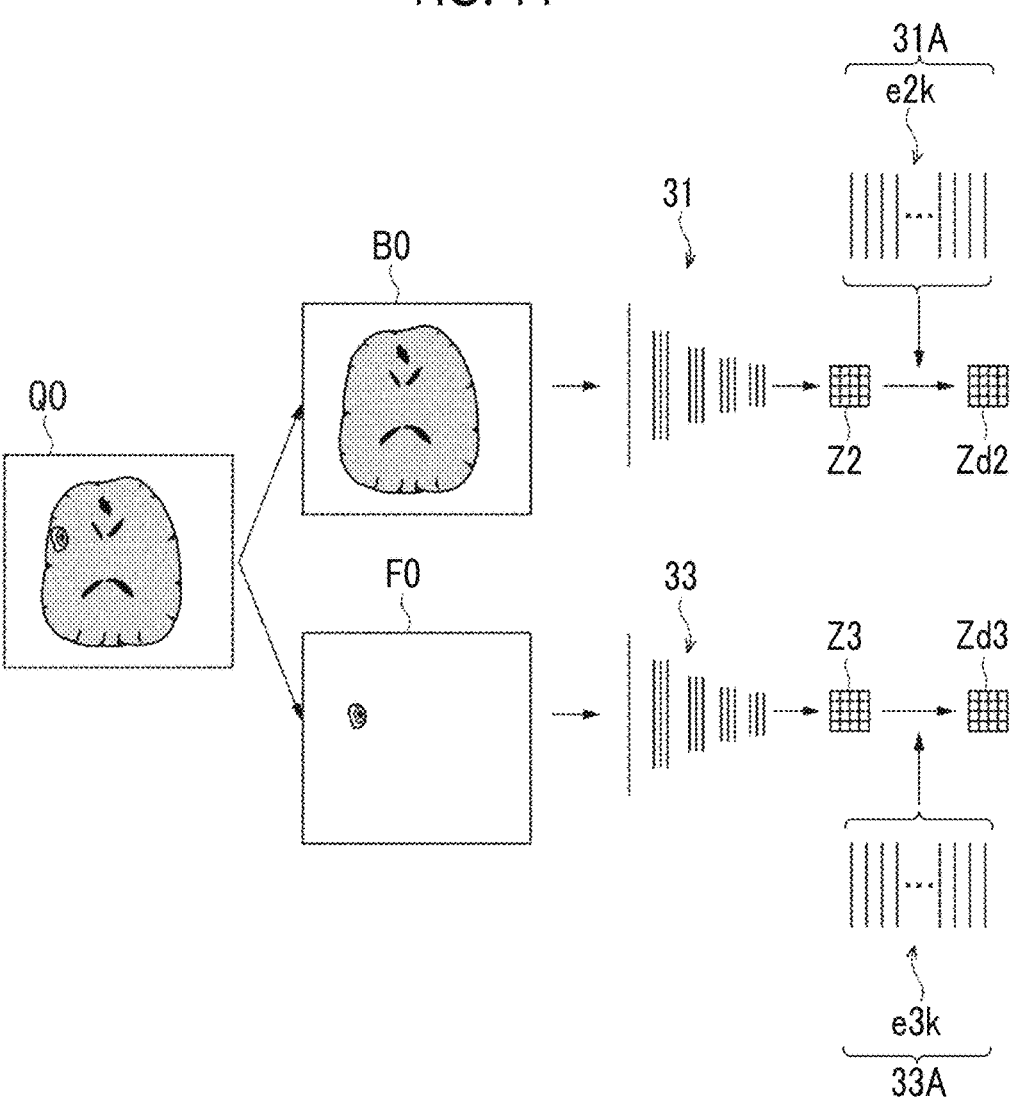

FIG. 11 is a diagram illustrating the derivation of the feature amount from the query image Q0 in a case in which a similar image is searched for. As illustrated in FIG. 11, in this embodiment, the label encoder 33 and the latent model 33A of the image encoding unit 22 derive, as the added finding feature amount, the quantized third latent variable zd3 that indicates the image feature for the abnormality of the finding included in the added finding label image F0 constituting the query image Q0. In addition, the encoder 31 and the latent model 31A of the image encoding unit 22 derive, as the query normal feature amount, the quantized second latent variable zd2 that indicates the image feature for the query base image B0 constituting the query image Q0. The similarity derivation unit 25 derives the similarity on the basis of the difference between the third latent variable zd3 derived for the query image Q0 and the first reference latent variable corresponding to the reference image and the difference between the second latent variable zd2 derived for the query image Q0 and the second reference latent variable corresponding to the reference image.

Specifically, as represented by the following Expression (1), the similarity derivation unit 25 derives a Euclidean distance $\sqrt{\{(Vq3(i, j)-Vr1(i, j))\}^2}$ between the corresponding position vectors of the third latent variable zd3 and the first reference latent variable in the map in the vector space of the latent variable and derives the sum $\Sigma[\sqrt{\{(Vq3(i, j)-Vr1(i, j))\}^2}]$ of the derived Euclidean distances. In addition, the similarity derivation unit 25 derives a Euclidean distance $\sqrt{\{(Vq2(i, j)-Vr2(i, j))\}^2}$ between the corresponding position vectors of the second latent variable zd2 and the second reference latent variable in the map and derives the sum $\Sigma[\sqrt{\{(Vq2(i, j)-Vr2(i, j))\}^2}]$ of the derived Euclidean distances. Then, the similarity derivation unit 25 derives the sum of the two sums as the similarity.

In Expression (1), S0 indicates the similarity, Vq3(i, j) indicates a vector at a map position (i, j) in the third latent variable zd3, Vr1(i, j) indicates a vector at a map position (i, j) in the first reference latent variable, Vq2(i, j) indicates a vector at a map position (i, j) in the second latent variable zd2, and Vr2(i, j) indicates a vector at a map position (i, j) in the second reference latent variable.

$$S0=\Sigma[\sqrt{\{(Vq3(i,j)-Vr1(i,j))\}^2}]+\Sigma[\sqrt{\{(Vq2(i,j)-Vr2(i,j))\}^2}] \quad (1)$$

In addition, the similarity S0 may be derived by the following Expression (1a) instead of the above-described Expression (1). Here, concat (a, b) is an operation of connecting a vector a and a vector b.

$$S0=\Sigma[\sqrt{\{(Vq32(i,j)-Vr12(i,j))\}^2}] \quad (1a)$$

where $$Vq32(i,j)=\text{concat}(Vq3(i,j),Vq2(i,j))$$

$$Vr12(i,j)=\text{concat}(Vr1(i,j),Vr2(i,j))$$

In addition, the derivation of the similarity S0 is not limited to the above-described method. For example, a Manhattan distance, a vector inner product, or a cosine similarity may be used instead of the Euclidean distance.

The extraction unit 26 extracts a similar reference image that is similar to the query image Q0 from the image database DB on the basis of the similarity S0 corresponding to input search conditions. The extraction unit 26 extracts the reference images that are similar to the query image Q0 as the similar reference images on the basis of the similarities S0 between the query image Q0 and all of the reference images registered in the image database DB. Specifically, the extraction unit 26 sorts the reference images in descending order of the similarity S0 to create a search result list. FIG. 12 is a diagram illustrating the search result list. As illustrated in FIG. 12, the reference images registered in the image database DB are sorted in descending order of the similarity S0 in a search result list 50. Then, the extraction unit 26 extracts a predetermined number of reference images sorted in descending order of the similarity in the search result list 50 as the similar reference images from the image database DB.

Figure 13:
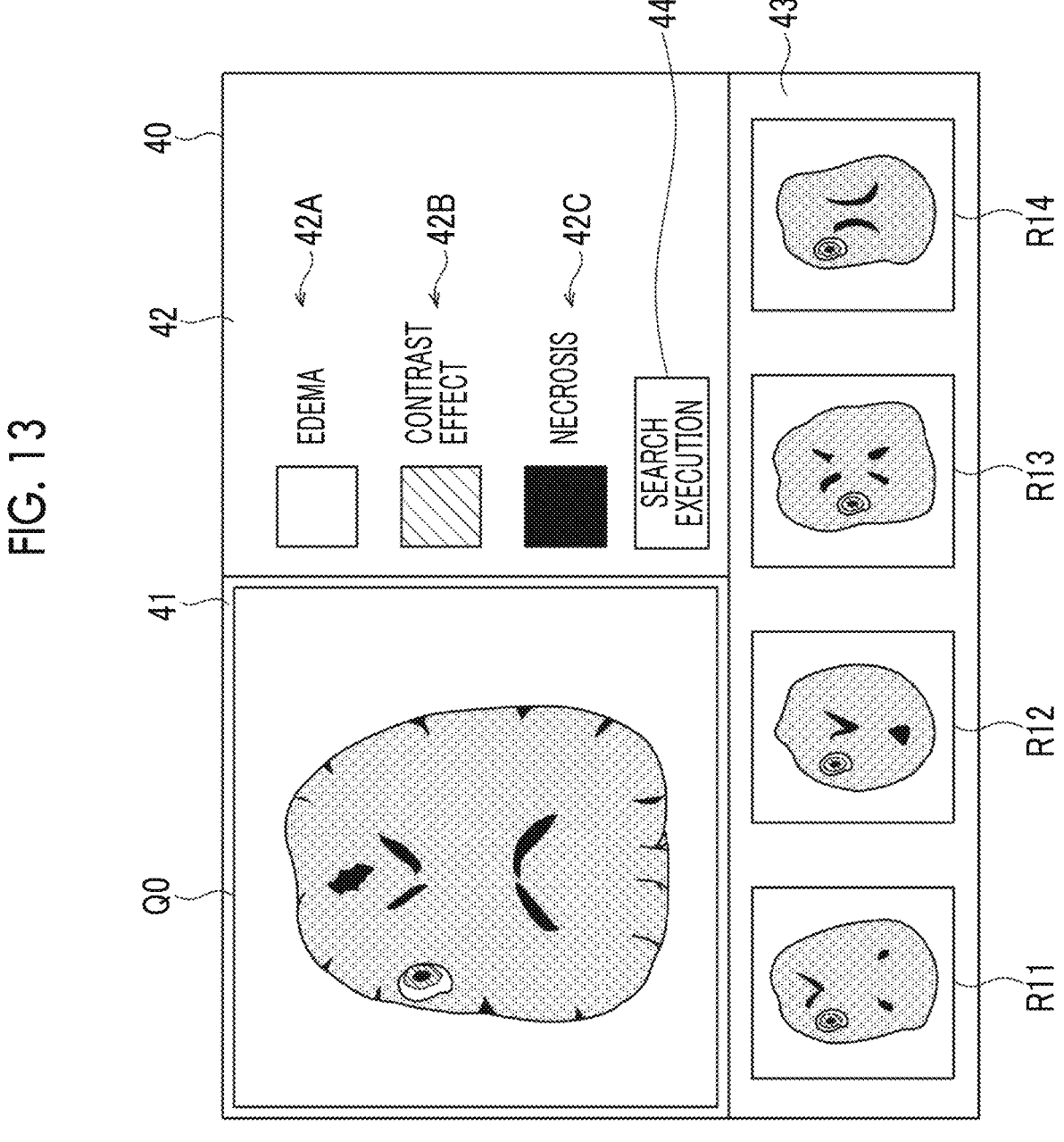
FIG. 13 is a diagram illustrating a search screen including a search result.

The display control unit 27 displays the extraction results by the extraction unit 26 on the display 14. FIG. 13 is a diagram illustrating a search screen including search results which are the extraction results by the extraction unit 26. As illustrated in FIG. 13, four similar reference images R11 to R14 that are similar to the query image Q0 are displayed in the third display region 43 of the search screen 40.

Figure 14:
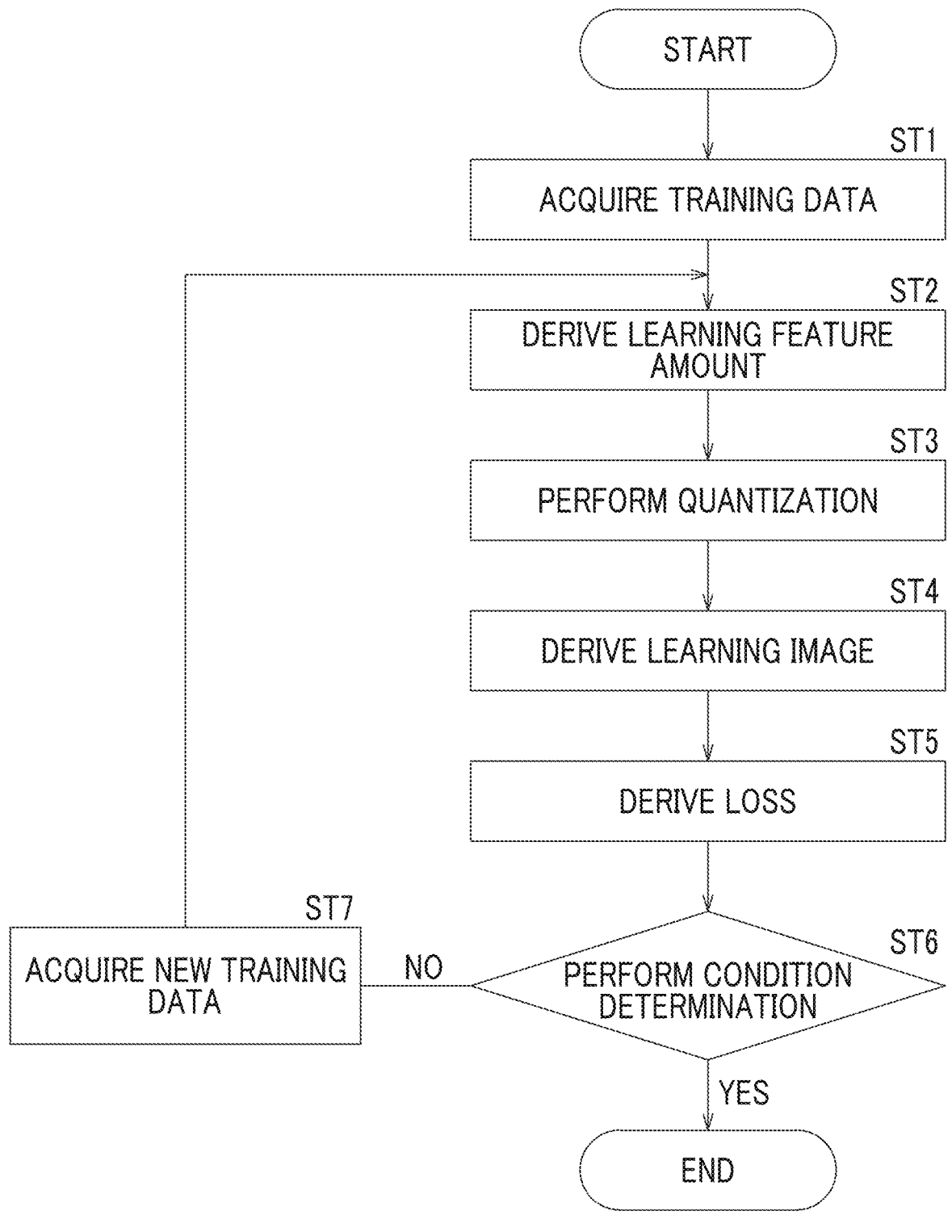
FIG. 14 is a flowchart illustrating a learning process performed in this embodiment.

Next, a process performed in this embodiment will be described. FIG. 14 is a flowchart illustrating a learning process performed in this embodiment. In addition, it is assumed that a plurality of training data items are acquired from the image storage server 3 and are stored in the storage 13. First, the learning unit 24 acquires one training data item 35 including the training image 36 and the training label image 38 from the storage 13 (Step ST1) and inputs the training image 36 included in the training data 35 to the encoder 31 of the image encoding unit 22. The encoder 31 derives the first latent variable z1 and the second latent variable z2 as the first learning feature amount and the second learning feature amount, respectively. Further, the learning unit 24 uses the training label image 38 as the training data 39 and inputs the training label image 38 to the label encoder 33 of the image encoding unit 22. The label encoder 33 derives the third latent variable z3 as the third learning feature amount (learning feature amount derivation; Step ST2).

Further, in a case in which the training finding label image VT0 is used as the training data 39, the derivation of the third learning feature amount from the training finding label image VT0 and the quantization thereof are performed after Step ST4 which will be described below.

Then, the learning unit 24 derives the quantized first latent variable zd1, the quantized second latent variable zd2, and the quantized third latent variable zd3 from the first latent variable z1, the second latent variable z2, and the third latent variable z3, respectively. Further, the learning unit 24 holds a copy of the quantized first latent variable zd1 as the first training feature amount zd1 in the memory 16 (quantization; Step ST3).

Then, the learning unit 24 inputs the quantized first latent variable zd1 to the decoder 32A of the image decoding unit 23. Then, the decoder 32A derives the learning finding label image VT0 corresponding to the type of the abnormality of the finding 37 from the training image 36. Further, in a case in which the training finding label image VT0 is used as the training data 39, the learning unit 24 holds a copy of the learning finding label image VT0 as the training finding label image VT0 in the memory 16. In addition, the learning unit 24 inputs the quantized second latent variable zd2 to the decoder 32B of the image decoding unit 23. Then, the decoder 32B derives the first learning reconstructed image VT1 obtained by reconstructing the image in a case in which the finding included in the training image 36 is a normal region. Further, the learning unit 24 inputs the second latent variable zd2 to the decoder 32C and collaterally inputs the learning finding label image VT0 having a size corresponding to the resolution of each processing layer of the decoder 32C to each processing layer of the decoder 32C. Then, the decoder 32C derives the second learning reconstructed image VT2 obtained by reconstructing the image feature of the training image 36 (learning image derivation; Step ST4).

Then, the learning unit 24 derives the first to eighth losses L1 to L8 as described above (Step ST5).

Then, the learning unit 24 determines whether or not the first to eighth losses L1 to L8 satisfy predetermined conditions (condition determination; Step ST6). In a case in which the determination result in Step ST6 is "No", the learning unit 24 acquires new training data from the storage 13 (Step ST7), returns to the process in Step ST2, and repeats the processes in Steps ST2 to ST6 using the new training data. In a case in which the determination result in Step ST6 is "Yes", the learning unit 24 ends the learning process. As a result, the encoder 31, the latent model 31A, the label encoder 33, and the latent model 33A of the image encoding unit 22, and the decoders 32A to 32C of the image decoding unit 23 are constructed.

Figure 15:
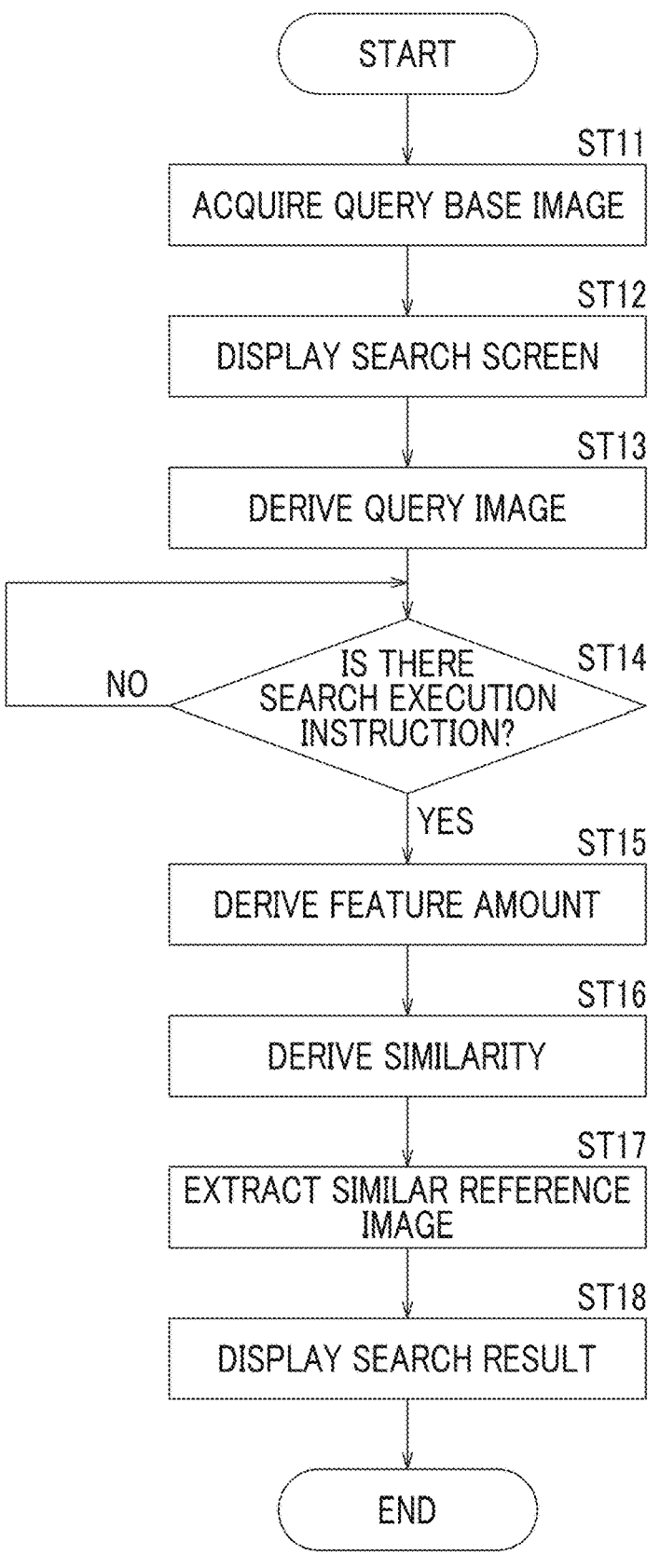
FIG. 15 is a flowchart illustrating an image search process performed in this embodiment.

Next, an image search process performed in this embodiment will be described. FIG. 15 is a flowchart illustrating the image search process performed in this embodiment. First, the information acquisition unit 20 acquires the query base image B0 for deriving the query image Q0 to be searched for, on the basis of an instruction from the user (Step ST11). The display control unit 27 displays the search screen 40 including the query base image B0 on the display 14 (Step ST12).

Then, the query image derivation unit 21 receives the drawing of a finding on the query base image B0 and derives the query image Q0 to which the finding has been added (Step ST13).

Then, in a case in which the search execution button 44 is selected to input a search execution instruction (Step ST14; YES), the image encoding unit 22 derives the quantized third latent variable zd3 for the added finding label image F0 constituting the query image Q0 and the quantized second latent variable zd2 for the query base image B0 constituting the query image Q0 as the added finding feature amount and the query normal feature amount, respectively (feature amount derivation; Step ST15). Then, the similarity derivation unit 25 derives the similarities between the query image Q0 and the reference images registered in the image database DB of the image storage server 3 on the basis of the added finding feature amount and the query normal feature amount (Step ST16). Then, the extraction unit 26 extracts a predetermined number of reference images having the highest similarity as the similar reference images according to the search conditions (Step ST17). Further, the display control unit 27 displays the similar reference images in the third display region 43 of the search screen 40 (search result display; Step ST18). Then, the process ends.

As described above, in this embodiment, the query image Q0 to which the finding has been added is derived by receiving the input of finding information indicating at least one finding, which is desired to be searched for, on the query base image B0. In addition, at least one added finding feature amount indicating the image feature for the added finding and at least one query normal feature amount indicating the image feature for the normal region included in the brain in the query base image B0 are derived, and the similarity between the query image Q0 and each of a plurality of reference images stored in the image storage server 3 is derived on the basis of the added finding feature amount and the query normal feature amount. Then, the reference image similar to the query image Q0 is extracted as the similar image from the image storage server 3 on the basis of the similarity.

Therefore, even in a case in which the query image Q0 including a desired finding is not at hand, the user can derive the query image Q0 including the desired finding and search for a similar image that is similar to the query image Q0. Therefore, the user does not need to perform an operation of searching for the query image Q0 from the images stored in the database. As a result, the user can easily search for a desired image.

Figure 16:
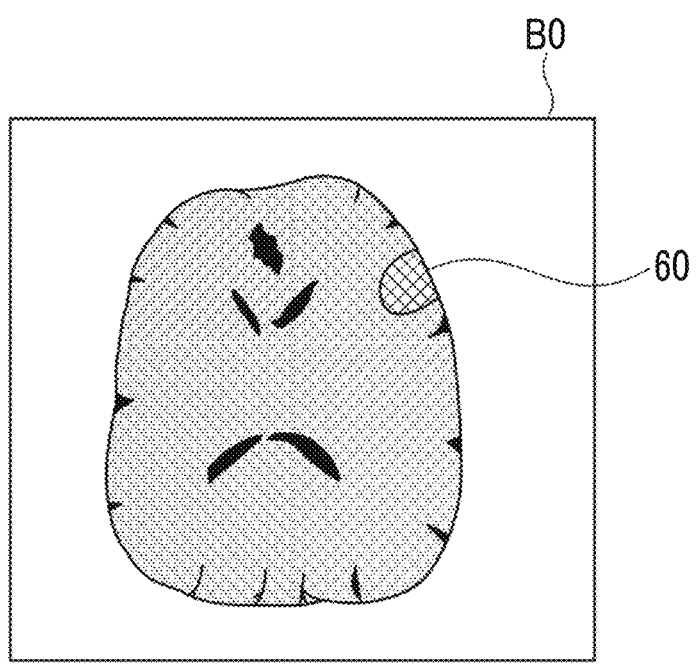
FIG. 16 is a diagram illustrating a query base image including a finding.

Further, in the above-described embodiment, a standard image in which the part desired to be searched for consists of only normal regions is used as the query base image B0. However, the present disclosure is not limited thereto. An image in which the part desired to be searched for includes a finding may be used as the query base image B0. FIG. 16 is a diagram illustrating an example of the query base image B0 including a finding. As illustrated in FIG. 16, the query base image B0 includes a finding 60, such as cerebral infarction, in the left brain.

Figure 17:
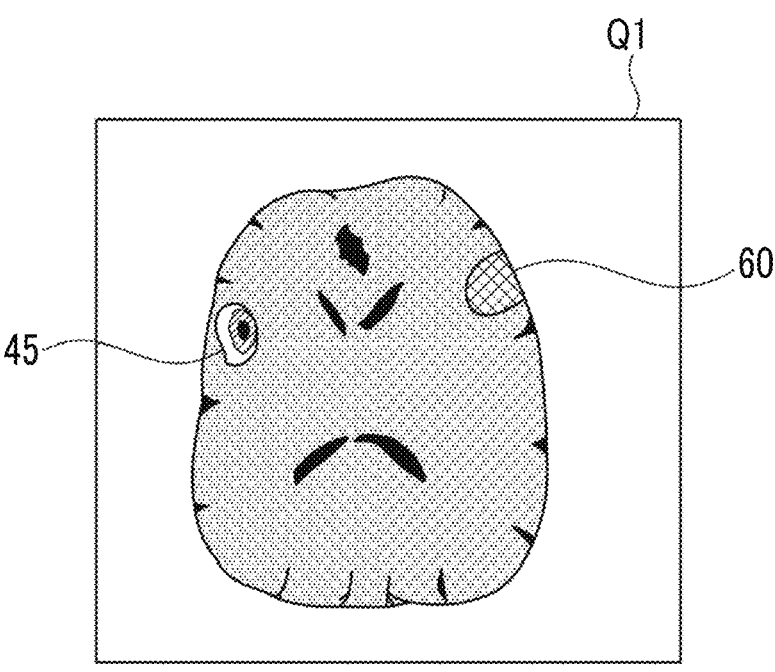
FIG. 17 is a diagram illustrating a query image derived by adding a finding to the query base image including the finding illustrated in FIG. 16.

FIG. 17 is a diagram illustrating a query image derived by adding a finding to the query base image B0 including the finding illustrated in FIG. 16. As illustrated in FIG. 17, a query image Q1 includes the finding 60 included in the query base image B0 and an added finding 45. In addition, the query image Q1 is composed of the query base image B0 including the finding 60 and the added finding label image F0 including only the finding 45. In this case, information indicating the finding 60 that is originally included in the query base image B0 may be substituted with the finding label information derived from the decoder 32A, and the finding label information may be corrected to more desirable label information that corresponds to the type of desired finding by the operation of the user to create the added finding label image F0.

In a case in which the similar image search is performed using the query image Q1 illustrated in FIG. 17, the label encoder 33 and the latent model 33A of the image encoding unit 22 derive the third latent variable zd3 that indicates the image feature for the abnormality of the finding included in the added finding label image F0 constituting the query image Q1. In addition, the encoder 31 and the latent model 31A of the image encoding unit 22 derive the second latent variable zd2 that indicates the image feature for the query base image B0 including the finding 60 which constitutes the query image Q1. Here, the second latent variable zd2 more appropriately indicates the image feature of the query base image B0 in a case in which the finding 60 included in the query base image B0 is a normal region.

Therefore, in this embodiment, even in a case in which the query base image B0 includes a finding, it is possible to derive the query image Q1 that includes a different finding at a position different from that of the included finding and to perform the similar image search.

In addition, in the above-described embodiment, the finding is added to only one location in the query base image B0. However, the present disclosure is not limited thereto. The findings may be added to a plurality of locations in the query base image B0. In this case, the added finding label image F0 includes the regions of the findings added to the plurality of locations.

Further, in the above-described embodiment, the encoder 31 and the latent model 31A of the image encoding unit 22, the decoders 32A to 32C of the image decoding unit 23, and the label encoder 33 and the latent model 33A of the image encoding unit 22 are trained at the same time. However, the present disclosure is not limited thereto. The encoder 31 and the latent model 31A of the image encoding unit 22 and the decoders 32A to 32C of the image decoding unit 23 may be trained first, and then the label encoder 33 and the latent model 33A of the image encoding unit 22 may be trained. In this case, the decoder 32A is not trained in a case in which the label encoder 33 and the latent model 33A are trained.

Further, in the above-described embodiment, in the image encoding unit 22, the third latent variable z3 derived by the label encoder 33 is input to the latent model 33A to acquire the quantized third latent variable zd3 close to the quantized first latent variable zd1. However, the present disclosure is not limited thereto. The latent model 33A may not be prepared, and the third latent variable z3 derived by the label encoder 33 may be input to the latent model 31A to directly acquire the quantized first latent variable zd1. In this case, the learning unit 24 may derive a difference between the third latent variable z3 before quantization and the first training feature amount zd1 as the eighth loss L8, instead of deriving the difference between the third latent variable zd3 and the first training feature amount zd1 as the eighth loss L8. In this case, the learning unit 24 may train the encoding learning model and the decoding learning model on the basis of only the first to sixth losses L1 to L6 and the eighth loss L8, without deriving the difference between the third latent variable zd3, which is the third learning feature amount, and a predetermined probability distribution of the third feature amount as the seventh loss L7.

Further, in the above-described embodiment, the first to third latent variables zd1 to zd3 are derived by constructing the encoding learning model with training. However, the present disclosure is not limited thereto. A trained model that has been created in advance may be used, or a feature amount computer designed on a rule basis may be used to derive the first to third latent variables zd1 to zd3. In particular, for the first latent variable and the third latent variable, the first feature amount derivation unit 22A of the encoder 31 and the label encoder 33 in the encoding learning model according to this embodiment can be relatively easily constructed, for example, using a data set in a case in which a model for segmenting a region of a finding from a medical image including the finding is trained.

Further, in the above-described embodiment, the MRI image is used as the query base image B0. However, the present disclosure is not limited thereto. In addition to the MRI image, a CT image, a PET image, a radiographic image acquired by imaging the object with radiation, an ultrasound image, or the like can be used as the query base image B0.

Further, in the above-described embodiment, the image of the brain is used as the target image. However, the target image is not limited to the image of the brain. An image including any part of the human body, such as a lung, a heart, a liver, a kidney, and limbs, in addition to the brain can be used as the target image. In this case, the encoder 31, the latent model 31A, the decoders 32A to 32C, the label encoder 33, and the latent model 33A may be trained using a training image and a training label image including diseases, such as tumor, infarction, cancer, and fracture, that appear in the part as the findings.

In addition, separate encoding learning models may be used for the first feature amount derivation unit 22A, the second feature amount derivation unit 22B, and the third feature amount derivation unit 22C, and the first feature amount, the second feature amount, and the third feature amount may be derived by the separate encoding learning models.

Further, in the above-described embodiment, for example, the following various processors can be used as a hardware structure of processing units performing various processes, such as the information acquisition unit 20, the query image derivation unit 21, the first feature amount derivation unit 22A, the second feature amount derivation unit 22B, the third feature amount derivation unit 22C, the segmentation unit 23A, the first reconstruction unit 23B, the second reconstruction unit 23C, the learning unit 24, the similarity derivation unit 25, the extraction unit 26, and the display control unit 27. The various processors include, for example, a CPU which is a general-purpose processor executing software (programs) to function as various processing units as described above, a programmable logic device (PLD), such as a field programmable gate array (FPGA), which is a processor whose circuit configuration can be changed after manufacture, and a dedicated electric circuit, such as an application specific integrated circuit (ASIC), which is a processor having a dedicated circuit configuration designed to perform a specific process.

One processing unit may be configured by one of the various processors or by a combination of two or more processors of the same type or different types (for example, a combination of a plurality of FPGAs or a combination of a CPU and an FPGA). In addition, a plurality of processing units may be configured by one processor.

A first example of the configuration in which a plurality of processing units are configured by one processor is an aspect in which one processor is configured by a combination of one or more CPUs and software and functions as a plurality of processing units. A representative example of this aspect is a client computer or a server computer. A second example of the configuration is an aspect in which a processor that implements the functions of the entire system including a plurality of processing units using one integrated circuit (IC) chip is used. A representative example of this aspect is a system-on-chip (SoC). As described above, various processing units are configured by one or more of the various processors as a hardware structure.

In addition, specifically, an electric circuit (circuitry) obtained by combining circuit elements, such as semiconductor elements, can be used as the hardware structure of the various processors.

What is claimed is:

1. An image search device comprising:

at least one processor, wherein the processor is configured to:

receive an input of finding information indicating at least one finding, which is desired to be searched for, on a query base image, which includes a part desired to be searched for and is a source of a query image, to derive the query image to which the finding has been added;

derive at least one added finding feature amount indicating an image feature for abnormality of the finding added to the query base image;

derive at least one query normal feature amount indicating an image feature for a normal region included in the part in the query base image;

with reference to an image database in which a plurality of reference images which include findings and in which at least one reference finding feature amount indicating an image feature for the abnormality of the finding included in each of the reference images and at least one reference normal feature amount indicating an image feature for a reference image in which the finding included in each of the reference images is a normal region are associated with each other have been registered, derive a similarity between the query image and each of the plurality of reference images on the basis of comparisons between the added finding feature amount and the query normal feature amount, and the reference finding feature amount and the reference normal feature amount; and extract the reference image that is similar to the query image as a similar image from the image database on the basis of the similarity.

2. The image search device according to claim 1, wherein the finding information includes a region corresponding to a type of the finding.

3. The image search device according to claim 1, wherein the processor is configured to:

encode the added finding to derive the added finding feature amount; and encode the query base image to derive the query normal feature amount.

4. The image search device according to claim 1, wherein the query base image is a standard image in which the part desired to be searched for consists of only normal regions.

5. The image search device according to claim 4, further comprising:

a storage that stores at least one finding feature vector indicating a representative image feature for the finding and a normal feature vector indicating a representative image feature for the normal region, wherein the processor is configured to:

derive the added finding feature amount by deriving an added finding feature vector indicating an image feature for the added finding and substituting the added finding feature vector with a finding feature vector that has a minimum difference from the added finding feature vector among the finding feature vectors to quantize the added finding feature vector; and derive the query normal feature amount by deriving a query normal feature vector indicating an image feature for a normal region included in the part in the query base image and substituting the query normal feature vector with a normal feature vector that has a minimum difference from the query normal feature vector among the normal feature vectors to quantize the query normal feature vector.

6. The image search device according to claim 1, wherein the query base image is an image including a finding, and the query normal feature amount indicates an image feature for an image in which the finding included in the query base image is a normal region.

7. The image search device according to claim 6, further comprising:

a storage that stores at least one finding feature vector indicating a representative image feature for the finding and a normal feature vector indicating a representative image feature for an image in which the included finding is a normal region, wherein the processor is configured to:

derive the added finding feature amount by deriving an added finding feature vector indicating an image feature for the added finding and substituting the added finding feature vector with a finding feature vector that has a minimum difference from the added finding feature vector among the finding feature vectors to quantize the added finding feature vector; and derive the query normal feature amount by deriving a query normal feature vector indicating an image feature for the query base image in which a region including the finding is a normal region in the query base image and substituting the query normal feature vector with a normal feature vector that has a minimum difference from the query normal feature vector among the normal feature vectors to quantize the query normal feature vector.

8. The image search device according to claim 1, wherein the processor is configured to:

derive the added finding feature amount using an encoding learning model that has been trained to derive the added finding feature amount in which the added finding is input.

9. The image search device according to claim 1, wherein the processor is configured to:

derive the query normal feature amount using an encoding learning model that has been trained to derive the query normal feature amount in which the query base image is input.

10. The image search device according to claim 1, wherein the reference finding feature amount and the reference normal feature amount are derived by encoding the reference image.

11. The image search device according to claim 10, wherein a combination of the reference finding feature amount and the reference normal feature amount indicates an image feature for the reference image.

12. The image search device according to claim 10, wherein the reference finding feature amount is quantized and derived by substituting a feature vector indicating an image feature for an abnormality of a finding included in the reference image with a first feature vector, which has a minimum difference from the image feature for the abnormality of the finding, among one or more first feature vectors indicating a representative image feature for the abnormality of the finding, and the reference normal feature amount is quantized and derived by substituting a feature vector indicating an image feature for the reference image in which the finding is a normal region with a second feature vector, which has a minimum difference from the image feature for the reference image in which the finding is the normal region, among one or more second feature vectors indicating a representative image feature for the image in which the finding is the normal region.

13. The image search device according to claim 10, wherein the reference finding feature amount and the reference normal feature amount are derived using an encoding learning model that has been trained to derive the reference finding feature amount and the reference normal feature amount in which the reference image is input.

14. An image search method comprising:

receiving an input of finding information indicating at least one finding, which is desired to be searched for, on a query base image, which includes a part desired to be searched for and is a source of a query image, to derive the query image to which the finding has been added;

deriving at least one added finding feature amount indicating an image feature for the abnormality of the finding added to the query base image;

deriving at least one query normal feature amount indicating an image feature for a normal region included in the part in the query base image;

deriving, with reference to an image database in which a plurality of reference images which include findings and in which at least one reference finding feature amount indicating an image feature for the abnormality of the finding included in each of the reference images and at least one reference normal feature amount indicating an image feature for a reference image in which the finding included in each of the reference images is a normal region are associated with each other have been registered, a similarity between the query image and each of the plurality of reference images on the basis of comparisons between the added finding feature amount and the query normal feature amount, and the reference finding feature amount and the reference normal feature amount; and extracting the reference image that is similar to the query image as a similar image from the image database on the basis of the similarity.

15. A non-transitory computer-readable storage medium that stores an image search program causing a computer to execute:

a procedure of receiving an input of finding information indicating at least one finding, which is desired to be searched for, on a query base image, which includes a part desired to be searched for and is a source of a query image, to derive the query image to which the finding has been added;

a procedure of deriving at least one added finding feature amount indicating an image feature for abnormality of the finding added to the query base image;

a procedure of deriving at least one query normal feature amount indicating an image feature for a normal region included in the part in the query base image;

a procedure of deriving, with reference to an image database in which a plurality of reference images which include findings and in which at least one reference finding feature amount indicating an image feature for the abnormality of the finding included in each of the reference images and at least one reference normal feature amount indicating an image feature for a reference image in which the finding included in each of the reference images is a normal region are associated with each other have been registered, a similarity between the query image and each of the plurality of reference images on the basis of comparisons between the added finding feature amount and the query normal feature amount, and the reference finding feature amount and the reference normal feature amount; and a procedure of extracting the reference image that is similar to the query image as a similar image from the image database on the basis of the similarity.

* * * * *